US011649548B2

(12) United States Patent
Pyun et al.

(10) Patent No.: US 11,649,548 B2
(45) Date of Patent: May 16, 2023

(54) METALLOPOLYMERS FOR CATALYTIC GENERATION OF HYDROGEN

(71) Applicant: ARIZONA BOARD OF REGENTS ON BEHALF OF THE UNIVERSITY OF ARIZONA, Tucson, AZ (US)

(72) Inventors: Dong-Chul Pyun, Tucson, AZ (US); Richard S. Glass, Tucson, AZ (US); Dennis Lichtenberger, Tucson, AZ (US); William Brezinski, Tucson, AZ (US); Kayla Clary, Tucson, AZ (US); Metin Karayilan, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 855 days.

(21) Appl. No.: 16/466,571

(22) PCT Filed: Dec. 11, 2017

(86) PCT No.: PCT/US2017/065632
§ 371 (c)(1),
(2) Date: Jun. 4, 2019

(87) PCT Pub. No.: WO2018/107169
PCT Pub. Date: Jun. 14, 2018

(65) Prior Publication Data
US 2019/0345618 A1    Nov. 14, 2019

Related U.S. Application Data

(60) Provisional application No. 62/431,964, filed on Dec. 9, 2016.

(51) Int. Cl.
*C25B 1/02* (2006.01)
*C25B 1/55* (2021.01)
(Continued)

(52) U.S. Cl.
CPC ............... *C25B 1/02* (2013.01); *C25B 1/55* (2021.01); *C25B 11/048* (2021.01); *B01J 31/165* (2013.01);
(Continued)

(58) Field of Classification Search
CPC ........ B01J 2531/842; C25B 1/02; C25B 1/04; C25B 1/55; C25B 11/048; C25B 11/073; C25B 11/085
See application file for complete search history.

(56) References Cited

U.S. PATENT DOCUMENTS 2,779,761 A    1/1957  Kibler
2,989,513 A    6/1961  Hendry et al.
(Continued)

FOREIGN PATENT DOCUMENTS

CN    104713968 A1    6/2015
EP    0806451 A1    11/1997
(Continued)

OTHER PUBLICATIONS

Michelin et al., "Photosensitization and Photocatalysis—Perspectives in Organic Synthesis," ACS Catalysis 2018 8 (12), 12046-12055 (Year: 2018).*
(Continued)

*Primary Examiner* — Nicholas A Smith
(74) *Attorney, Agent, or Firm* — Nguyen Tarbet LLC

(57) ABSTRACT

Metallopolymers composed of polymers and catalytically active diiron-disulfide ([2Fe-2S]) complexes are described herein. [FeFe]-hydrogenase mimics have been synthesized and used to initiate polymerization of various monomers to generate metallopolymers containing active [2Fe-2S] sites which serve as catalysts for a hydrogen evolution reaction (HER). Vinylic monomers with polar groups provided water solubility relevant for large scale hydrogen production,
(Continued)

leveraging the supramolecular architecture to improve catalysis. Metallopolymeric electrocatalysts displayed high turnover frequency and low overpotential in aqueous media as well as aerobic stability. Metallopolymeric photocatalysts incorporated P3HT ligands to serve as a photosensitizer to promote photoinduced electron transfer to the active complex.

18 Claims, 18 Drawing Sheets

(51) Int. Cl.
 C25B 11/048 (2021.01)
 B01J 31/16 (2006.01)
 H01M 4/90 (2006.01)

(52) U.S. Cl.
 CPC ...... B01J 2531/842 (2013.01); H01M 4/9008 (2013.01)

(56) References Cited

U.S. PATENT DOCUMENTS

| | | | |
|---|---|---|---|
| 3,251,797 A | 5/1966 | De Pugh et al. | |
| 3,290,266 A | 12/1966 | Barnes et al. | |
| 3,542,701 A | 11/1970 | Van Raamsdonk | |
| 3,563,962 A | 2/1971 | Mirviss | |
| 3,767,613 A | 10/1973 | Dix et al. | |
| 3,892,686 A | 7/1975 | Woo | |
| 4,000,347 A | 12/1976 | Ranney et al. | |
| 4,094,751 A | 6/1978 | Nozik | |
| 4,238,585 A | 12/1980 | Bertozzi | |
| 4,346,191 A | 8/1982 | Blount | |
| 4,382,846 A | 5/1983 | Gratzel et al. | |
| 4,568,435 A | 2/1986 | Shelnutt | |
| 4,606,798 A | 8/1986 | Sasse et al. | |
| 4,671,896 A | 6/1987 | Hasegawa et al. | |
| 4,749,347 A | 6/1988 | Valavaara | |
| 4,752,507 A | 6/1988 | Johansson et al. | |
| 4,833,048 A | 5/1989 | DeJonghe et al. | |
| 5,115,060 A | 5/1992 | Grey | |
| 5,121,329 A | 6/1992 | Crump | |
| 5,279,910 A | 1/1994 | Sasaki et al. | |
| 5,371,176 A | 6/1994 | Bezwada et al. | |
| 5,362,493 A | 11/1994 | Skotheim et al. | |
| 5,811,470 A | 9/1998 | Prindle et al. | |
| 5,929,202 A | 7/1999 | Arita et al. | |
| 6,011,094 A | 1/2000 | Planche et al. | |
| 6,072,026 A | 6/2000 | Kawase et al. | |
| 6,111,030 A | 8/2000 | Hartman et al. | |
| 9,306,218 B2 | 4/2016 | Pyun et al. | |
| 9,463,597 B2 | 10/2016 | Van De Vrie et al. | |
| 9,567,439 B1 | 2/2017 | Pyun et al. | |
| 2001/0047043 A1 | 11/2001 | Okoroafor et al. | |
| 2001/0047403 A1 | 11/2001 | Okoroafor et al. | |
| 2002/0039680 A1 | 4/2002 | Hwang et al. | |
| 2005/0164297 A1 | 7/2005 | Chen et al. | |
| 2007/0010600 A1 | 1/2007 | Goodman et al. | |
| 2007/0253772 A1 | 11/2007 | Kubo et al. | |
| 2008/0038645 A1 | 2/2008 | Kolosnitsyn et al. | |
| 2010/0029163 A1 | 2/2010 | Ogle et al. | |
| 2011/0245360 A1 | 10/2011 | Hahn et al. | |
| 2011/0263755 A1 | 10/2011 | Mohamed et al. | |
| 2012/0264837 A1 | 10/2012 | Eberstaller et al. | |
| 2013/0040197 A1 | 2/2013 | Liu et al. | |
| 2013/0064904 A1 | 3/2013 | Gojon-Romanillos et al. | |
| 2014/0110881 A1 | 4/2014 | Keledjian et al. | |
| 2014/0199592 A1 | 7/2014 | Pyun et al. | |
| 2015/0203638 A1 | 7/2015 | Sivanandan et al. | |
| 2018/0079865 A1 | 3/2018 | Pyun | |
| 2018/0105649 A1 | 4/2018 | Pyun et al. | |

FOREIGN PATENT DOCUMENTS

| | | |
|---|---|---|
| EP | 1882713 A1 | 1/2008 |
| EP | 2093605 A1 | 8/2009 |
| EP | 2896644 A1 | 7/2015 |
| GB | 1203577 A | 8/1970 |
| GB | 1516554 A | 7/1978 |
| WO | WO1995018652 A1 | 7/1995 |
| WO | WO2007076067 A3 | 7/2007 |
| WO | WO2009158385 A | 12/2009 |
| WO | WO2013023216 A1 | 2/2013 |
| WO | WO2013155038 A1 | 10/2013 |
| WO | WO2014052255 A1 | 4/2014 |
| WO | WO2014179100 A1 | 11/2014 |
| WO | WO2015123552 A1 | 8/2015 |

OTHER PUBLICATIONS

Eloi et al, "Metallopolymers with emerging applications," Materials Today, vol. 11, Issue 4, 2008, pp. 28-36. (Year: 2008).*
Chung, W.J. et al. , "Elemental Sulfur as a Reactive Medium for Gold Nanoparticles and Nanocomposite Materials", Angewandte Chemie International Edition, 2011, 50, 11409-11412.
Colquhoun, Howard M., "Materials that heal themselves", Nature Chemistry, Jun. 2012, vol. 4, 435-436.
Yang, Ying and Urban Marek W., "Self-healing polymeric materials", Chem. Soc. Rev., 2013, 42, 7446-7467.
Hasegawa, Urara and Van Der Vlies, André J., "Design and Synthesis of Polymeric Hydrogen Sulfide Donors", Bioconjugate Chemistry, 2014, 25 (7), 1290-1300.
Foster, Jeffrey C., et al., "S-Aroylthiooximes: A Facile Route to Hydrogen Sulfide Releasing Compounds with Structure-Dependent Release Kinetics", Organic Letters. 2014, 16, 1558-1561.
Wurthner, F., "Perylene bisimide dyes as versatile building blocks for functional supramolecular architectures", Chem. Commun. 2004, 1564-1579.
Chung, W.-. et al., "The use of elemental sulfur as an alternative feedstock for polymeric materials", Nature Chemistry 2013, vol. 5, 518-524.
Simmonds, A.G. et al., "Inverse Vulcanization of Elemental Sulfur to Prepare Polymeric Electrode Materials for Li-S Batteries", ACS Macro Lett. 2014, 3, 229-232.
Liu, G. et al., "α-Sulfur Crystals as a Visible-Light-Active Photocatalyst", J. Am. Chem. Soc. 2012, 134, 9070-9073.
Asmus, K.-D., "Pulse Radiolysis Methodology", Methods in Enzymology 1984, 105, 167-178.
Nishide, et al., "Toward Flexible Batteries", (2008) Science, vol. 319, 737-738.
Nishide, et al., "Emerging N-Type Redox-Active Radical Polymer for a Totally Organic Polymer-Based Rechargeable Battery", (2009), Adv Mater, 21, 1627-1630.
Tarascon, et al., "Key challenges in future Li-battery research", (2010) Phil Trans R Soc A, 368, 3227.
Rotinjanz, et al. (1908) Z. Physik Chem, 62, 609.
Bacon, et al., "The Viscosity of Sulfur", (1943) J Am Chem Soc, 65, 639.
Eyring, et al., "The Properties of Liquid Sulfur", (1943) J Am Chem 65, 648.
Tobolsky, A. V. et al., "Equilibrium Polymerization of Sulfur", Am. Chem. Soc. 1959, 81, 780.
Penczek, et al. (1974) Nature, 273, 738.
Mazar et al., "A highly ordered nanostructured carbon-sulphur cathode for lithium-sulphur batteries", Nature Mater. 2009, 8, 500-506.
Scrosati, et al., "A High-Performance Polymer Tin Sulfur Lithium Ion Battery", Angew. Chem. Int. Ed. 2010, 49, 2371-2374.
Chen, et al., J. Phys. Chem. C 2011, 115, 6057-6063.
Yang, et al., ACS Nano 2011, 5, 9187-9193.
Bartlett, et al., (1956) J Am Chem Soc, 78, 3710.
Mcgrath, et al. (2006) Polymer, 47, 4042.
Ueda et al., (2009) J Mater Chem, 19, 8907.

(56) References Cited

OTHER PUBLICATIONS

Trofimov, et al. (2002) "Sulfur-rich copolymers of sulfur with 5-vinylbicyclo hept-2-ene and tricyclo deca-3,8-diene as prospective cathode materials for lithium cells," Sufur Letters, 25: 219-227.
Ming, et al., (2004) "Novel cathode material based on chloropolystyrene," PMSE Preprints, American Chemical Society 90: 396-397.
Wang, et al., Nano Lett. 2011, 11, 2644-2647.
Zheng, et al., Nano Lett. 2011, 11, 4462-1467.
Li, et al., Proc. Nail. Acad. Sci. U.S.A. 2013, 110, 7148-7153.
Zheng, et al., Nano Lett. 2013, 13, 1265-1270.
Zhou, et al., ACS Nano 2013, 7, 8801-8808.
Seh, et al., Nat. Commun. 2013, 4.
Li, et al., Nano Lett. 2013, 13, 5534.
Liu, et al., Nat. Nanolech. 2014, 9, 187.
Pyun, J. Angew. Chem Int. Ed., 2011, 50, 11409-11412.
Woo et al. Nature Chemistry. Jun. 2013. vol. 5, pp. 518-524. Published online Apr. 14, 2013.
Suzuki et al. Hydrogen generation using water-insoluble polymer-bound ruthenium(ii) Complexes. Chemical Communications, 1997, Issue 2, p. 227.
Suzuki et al. Photoinduced hydrogen generation from water-insoluble polymer photosensitizer films. Polymer, 1998, vol. 39, Issue 8, p. 1539-1543.
Suzuki et al. Photoinduced hydrogen generation using polymer photosensitizers. Macromolecular Chemistry and Physics, Jun. 1998, vol. 199, Issue 6.
Wang et al. A metal-free polymeric photocatalyst for hydrogen production from water under visible light. Nature Materials 8, 76-80 (2009).
Goldsmith et al. Discovery and High-Throughput Screening of Heteroleptic Iridium Complexes for Photoinduced Hydrogen Production. J. Am. Chem. Soc., 2005, 127 (20), pp. 7502-7510.
Tinker et al. Visible Light Induced Catalytic Water Reduction without an Electron Relay. Chemistry—A European Journal, 2007, vol. 13, Issue 31, pp. 8726-8732.
Happ et al. Towards Hydrogen Evolution Initiated by LED Light: 2-(1 H -1,2,3-Triazol-4-yl)pyridine containing Polymers as Photocatalyst. Macromolecular Rapid Communications, Apr. 2015, vol. 36, Issue 7, 671-677.
Aguirre De Carcer et al. Active-Site Models for Iron Hydrogenases: Reduction Chemistry of Dinuclear Iron Complexes. Inorg. Chem., 2006, 45 (20), pp. 8000-8002.
Alongia et al. Caseins and hydrophobins as novel green flame retardants for cotton fabrics. Polymer Degradation and Stability vol. 99, Jan. 2014, pp. 111-117.
Beom-Young Ryu and Todd Emrick. Thermally Induced Structural Transformation of Bisphenol-1,2,3-triazole Polymers: Smart, Self-Extinguishing Materials. Angew. Chem. Int. Ed. 2010, 49, 9644-9647.
Laufer et al. Clay-Chitosan Nanobrick Walls: Completely Renewable Gas Barrier and Flame-Retardant Nanocoatings. ACS Appl. Mater. Interfaces 2012, 4, 1643-1649.
Laufer et al. Exceptionally Flame Retardant Sulfur-Based Multilayer Nanocoating for Polyurethane Prepared from Aqueous Polyelectrolyte Solutions. ACS Macro Lett., 2013, 2 (5), pp. 361-365.
Li et al. Intumescent All-Polymer Multilayer Nanocoating Capable of Extinguishing Flame on Fabric. Adv. Mater. 2011, 23, 3926-3931.
Seidel, R et al. Synthesis and characterization of [FeFe]-hydrogenase mimics appended with a 2-phyenylazopyridine ligand, Journal of Sulfur Chemistry, 2013, 567-579, vol. 34, No. 6, Taylor & Francis, Tucson, Arizona, USA.
Ding et al. Photoelectrocatalytic Water Splitting: Significance of Cocatalysts, Electrolyte, and Interfaces. ACS Catal. 2017, 7, 675-688.
Swenson, M. Synthesis and Characterization of [Fe Fe) Hydrogenase Mimics. The University of Arizona, 2013, pp. 1-157 online), [retrieved on Jan. 19, 2018]. Retrieved from the Internet <http://arizona.openrepository.com/arizona/handle/1 0150/294029>.
Li et al. "Unique Co-Catalytic Behavior of Protic Ionic Liquids as Multifunctional Electrolytes for Water Splitting." ChemElectroChem 3.2 (2016): 204-208.
Shinagawa, Tatsuya, and Kazuhiro Takanabe. "Towards versatile and sustainable hydrogen production through electrocatalytic water splitting: electrolyte engineering." ChemSusChem 10.7 (2017): 1318-1336.

\* cited by examiner

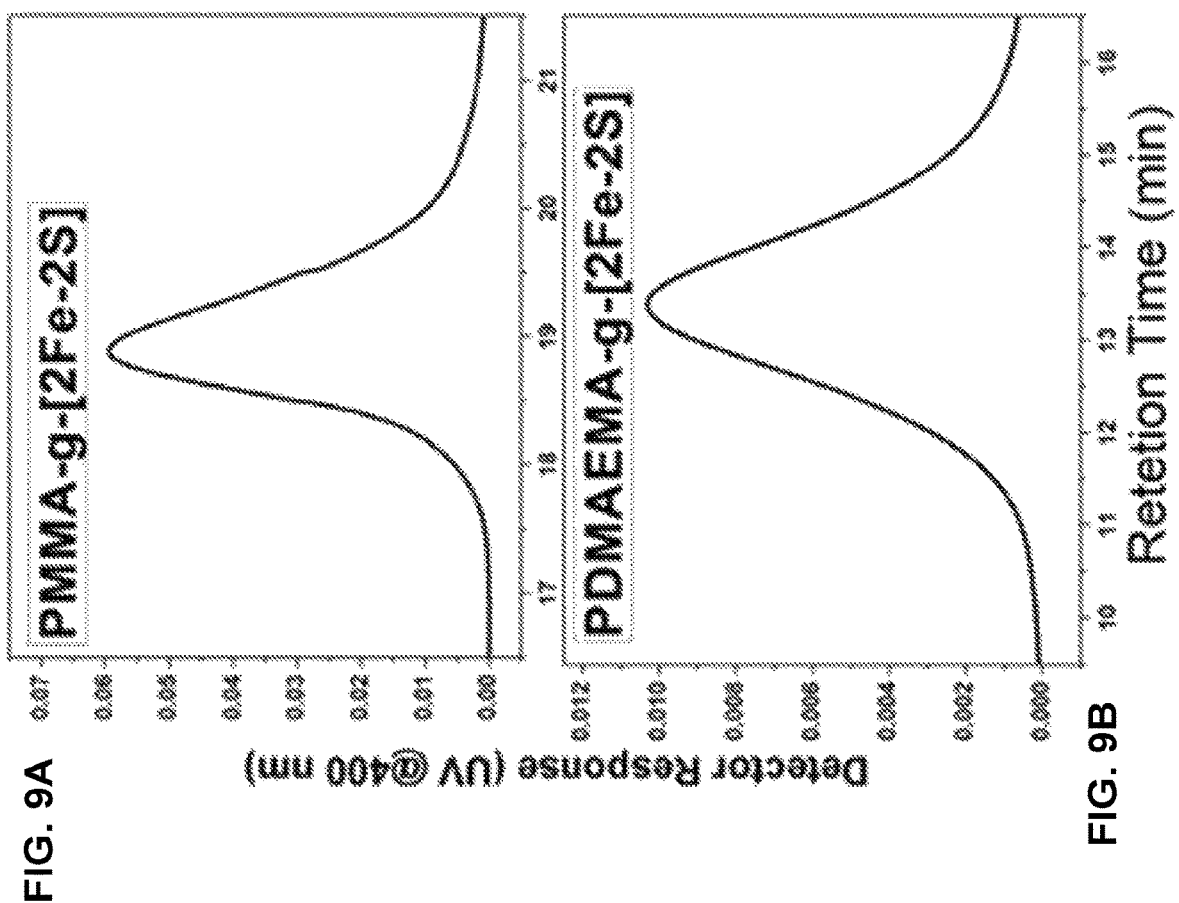
FIG. 9A
FIG. 9B
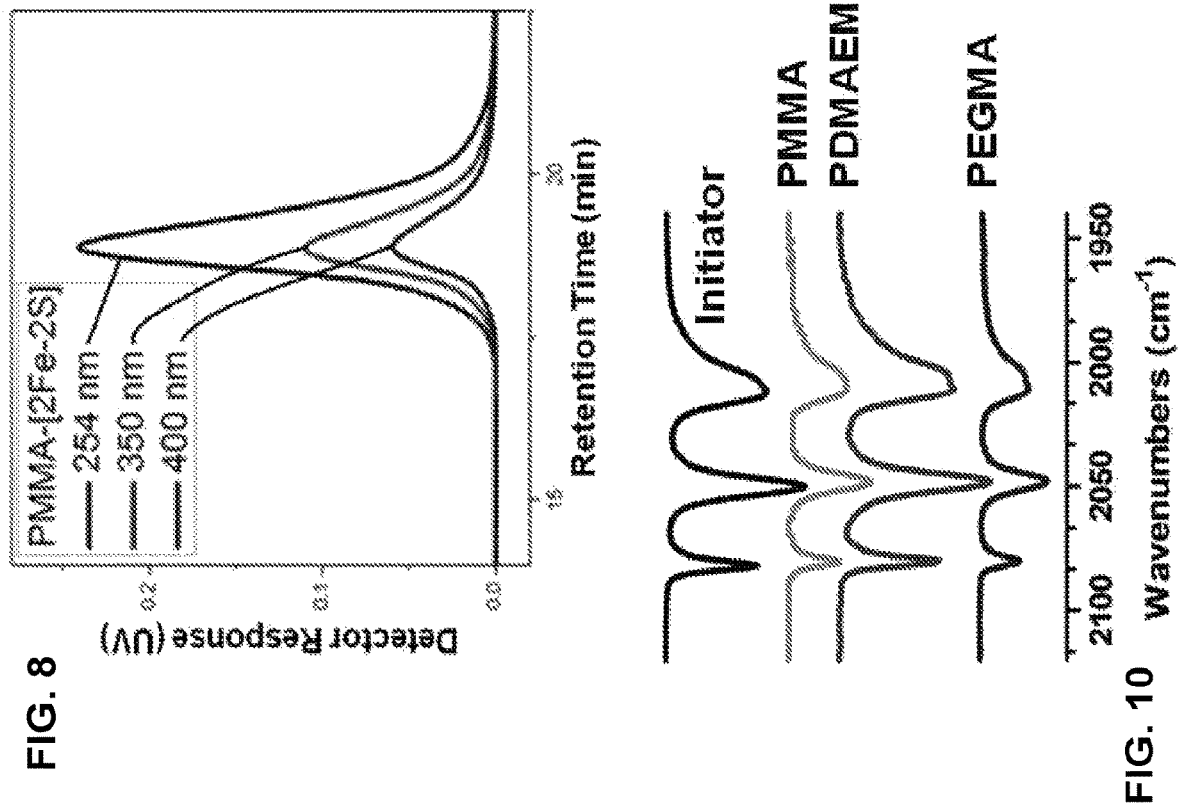
FIG. 8
FIG. 10

METALLOPOLYMERS FOR CATALYTIC GENERATION OF HYDROGEN

CROSS REFERENCE

This application claims priority to U.S. Provisional Patent Application No. 62/431,964, filed Dec. 9, 2016, the specification(s) of which is/are incorporated herein in their entirety by reference.

GOVERNMENT SUPPORT

This invention was made with government support under Grant Nos. CHE1111570, CHE111718, and CHE1664745 awarded by NSF. The government has certain rights in the invention.

FIELD OF THE INVENTION

The present invention relates to metallopolymers, in particular, to diiron-based complexes that are biomimetic analogues of the active sites in Fe—Fe hydrogenase enzymes and also active in catalytic generation of molecular hydrogen ($H_2$).

BACKGROUND OF THE INVENTION

There has been a tremendous world-wide interest in developing clean and abundant energy sources as alternatives to fossil fuels to satisfy the rapidly growing need for energy. Development of solar voltaic cells to convert solar energy into electrical energy is very promising. However, this energy source is intermittent and electrical energy, while useful, must be used immediately or it is lost. One promising way to store this energy is in the form of chemical bonds. Particularly promising is to warehouse this energy in the strong chemical bond in molecular hydrogen ($H_2$). The development of the "$H_2$ economy", which is a proposed system based on the production, storage, and utilization of hydrogen as an energy carrier, has generated considerable interest. However, one of the key challenges in this field is the creation of efficient catalytic systems to generate $H_2$ via splitting of $H_2O$. Electrochemical splitting of water to convert it into $H_2$ and $O_2$ typically uses platinum catalysts, which are rare and expensive. Considerable inspiration has been drawn from photosynthetic processes and other biological systems for the generation of $H_2$. Promising alternatives are suggested by the hydrogenase enzymes produced by anaerobic bacteria that catalyze the reduction of protons to $H_2$ with very high rates (up to ca. $10^4$ molecules of $H_2$ per enzyme per second) with little overpotential and whose active sites contain the Earth abundant and inexpensive metals: iron and nickel. The active site 1 of [FeFe]-hydrogenase is shown low:

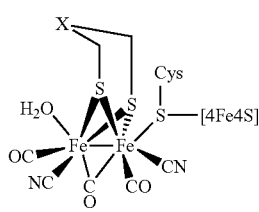

1

Owing to the relative simplicity of the active site 1, X=NH of this enzyme, [FeFe]-hydrogenase and [NiFe]-hydrogenase have inspired the preparation and study of small molecule mimics of these active sites as electrocatalysts for $H_2$ production. Numerous biomimetic analogues of the active site have been synthesized and studied as electrocatalysts for $H_2$ production. The active site is buried within the protein of the enzymes (FIG. 2). Electrons, e.g. from reduced methyl viologen which is a commonly used in vitro reductant (the physiological electron donors are ferredoxin and flavodoxin), are transferred to the buried active site via [4Fe4S] redox centers (one of which is shown in 1 and the entire moiety shown in 1 is known as the H-cluster). Proton and $H_2$ channels have also been proposed and convincingly established for this enzyme. The current hypothesis is that the reduced form of the enzyme is an Fe(I)-Fe(I) species and the catalytically active Fe(I)-Fe(II) yields H—Fe(II)-Fe(II) on protonation coupled with the [4Fe4S] redox center donating an electron to the distal iron. Although a μ-bridged hydride is more stable than a terminal hydride, the terminal hydride is believed to be more reactive and formed kinetically.

Scheme 2 shows non-limiting examples [FeFe]-hydrogenase active site analogues.

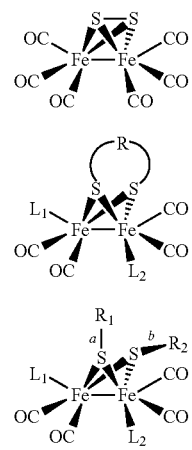

Previous reports demonstrated that disulfide 2 could be synthesized by reaction of iron pentacarbonyl, sulfur and base. For example, referring to Scheme 2, three strategies have been reported for transforming 2 into bridged 3 and unbridged 4 which are analogues of the active site of [FeFe]-hydrogenase: (1) reduction of 2 to the corresponding dithiolate followed by alkylation; (2) nucleophilic addition to sulfur of the disulfide by Grignard of lithium organometallic reagents followed by alkylation; and (3) conjugate addition of the dithiol obtained from 2 to α,β-unsaturated carbonyl compounds. In addition, reaction of thiols, dithiols or disulfides with iron carbonyl complexes also affords 3 or 4. Complexes analogous to 3 and 4 in which CO ligands have been substituted by cyanides, isocyanides, phosphines, phosphites, bis-phosphines, heterocyclic carbenes, sulfides, sulfoxides, or nitrosyl ligands have also been reported. Despite impressive advances in this area, several important challenges remain: to increase the activity and stability of the catalysts, to lower their overpotential, to use water as the solvent and proton source, to inhibit aggregation while maintaining rapid electron transfer to the active site, and to increase aerobic stability.

To overcome many of the current limitations in biomimetic [2Fe-2S] electrocatalysts, immobilization of these complexes onto heterogeneous or homogeneous supports has been widely explored. More recently, conjugation of soluble polymers to [2Fe-2S] complexes has been explored, particularly as a route to catalytic metallopolymers, where the active catalyst is incorporated into either the main chain of the polymer, or as pendant side chain groups. The synthesis of these materials has been demonstrated for a number of different systems. For example, Green et al. discloses amide coupling to TentaGel resin beads (Kayla N. Green, Jennifer L. Hess, C. M. T. and M. Y. D. Resin-bound models of the [FeFe]-hydrogenase enzyme active site and studies of their reactivity. *Dalton Trans.* 4344 (2009), doi: 10.1039/b821432h), and Ibrahim et al. teaches ester coupling to functionalized polypyrrole and thiol bridging to functionalized polypyrrole (Ibrahim, S. K., Liu, X., Tard, C. & Pickett, C. J. Electropolymeric materials incorporating subsite structures related to iron-only hydrogenase: active ester functionalised poly(pyrroles) for covalent binding of {2Fe3S}-carbonyl/cyanide assemblies. *Chem. Commun.* 1535-1537 (2007).

As another example, the use of "click" reactions with small molecule [2Fe-2S] moieties bearing alkyne components onto azide functional polyvinyl chloride has also been explored by Wang et al. (Wang, L., Xiao, Z., Ru, X. & Liu, X. Enable PVC plastic for a novel role: its functionalisation with diiron models of the sub-unit of [FeFe]-hydrogenase, assembly of film electrodes, and electrochemical investigations. *RSC Adv.* 1, 1211 (2011)). Moreover, Tooley et al. discloses polymer backbones prepared by controlled radical polymerization (CRP) methods, namely reversible addition-fragmentation chain transfer (RAFT) polymerization has been utilized via use of chain end modifications to unmask thiol end-groups for subsequent thiol-ene reactions to alkene/alkyne functional [2Fe-2S] complexes (Tooley, C. A., Pazicni. S. & Berda, E. B. Toward a tunable synthetic [FeFe] hydrogenase mimic: single-chain nanoparticles functionalized with a single diiron cluster. *Polym. Chem.* 6, 7646-7651 (2015)).

In addition to attaching [2Fe-2S] moieties to polymers, [2Fe-2S] small molecules with appropriate functional groups were polymerized. For instance, a [2Fe-2S] core appended with one alkyne group was polymerized with $WCl_6$-$Ph_4Sn$ to give a polyene with multiple [2Fe-2S] sites which was spin coated on an electrode, as taught in Zhan et al. (Zhan, C. et al. Synthesis and characterisation of polymeric materials consisting of {Fe2(CO)5}-unit and their relevance to the diiron sub-unit of [FeFe]-hydrogenase. *Dalton Trans.* 39, 11255 (2010)). Also, Zhu et al. discloses polymers prepared by "click" chemistry using small molecule diazides and [2Fe-2S] moieties appended with two alkynes (Zhu. X., Zhong, W. & Liu. X. Polymers functionalized with 1,2-benzenedithiolate-bridged model compound of [FeFe]-hydrogenase: Synthesis, characterization and their catalytic activity. *Int. J. Hydrogen Energy.* 41, 14068-14078 (2016)). Further still, CRP of [2Fe-2S] functional styrenics via RAFT has also been achieved and studied as an electrocatalyst for $H_2$ generation by Heine et al. (Heine, D., Pietsch, C., Schubert, U. S. & Weigand, W. Controlled radical polymerization of styrene-based models of the active site of the [FeFe]-hydrogenase. *J. Polym. Sci. Part A Polym. Chem.* 51, 2171-2180 (2013)), and Frechét-type dendrimers containing [2Fe-2S] units have been prepared but not studied as electrocatalysts for $H_2$ production in Li et al. (Li, Y. et al. Exceptional dendrimer-based mimics of diiron hydrogenase for the photochemical production of hydrogen. *Angew. Chem. Int. Ed.* 52, 5631-5635 (2013)).

While these reports demonstrate the viability of conjugated [2Fe-2S] complexes to polymeric materials to enhance catalytic performance, there remain numerous challenges to this concept, namely, homogeneity under aqueous electrocatalytic conditions and robust air stability. To date, three strategies have been explored to use [2Fe-2S] mimics in water: (1) attaching the [2Fe-2S] moiety to the electrode covalently, or modified electrode surface; (2) as a heterogeneous catalyst, by appending the [2Fe-2S] core with hydrophilic moieties; and (3) by including the [2Fe-2S] species in water soluble supramolecular complexes or micelles. Use of membrane electrodes for $H_2$ generation in water has been reviewed by Xu et al. (Xu, E. et al. [FeFe]-hydrogenase-inspired membrane electrode and its catalytic evolution of hydrogen in water. *RSC Adv.* 2, 10171-10174 (2012)) and use of polyethyleneimine membrane electrodes with [FeFe] mimics more recently reported by Zhu et al. (Zhu, D., Xiao, Z. & Liu, X. Introducing polyethyleneimine (PEI) into the electrospun fibrous membranes containing diiron mimics of [FeFe]-hydrogenase: Membrane electrodes and their electrocatalysis on proton reduction in aqueous media. *Int. J. Hydrogen Energy.* 40, 5081-5091 (2015)). Water solubility has been previously achieved with [FeFe] cores via appended sulfonates, sugars, 3,7-diacetyl-1,3,7-triaza-5-phosphabicyclo[3.3.1]nonane ligands, two cyano ligands (dianion), water soluble quantum dots, and polyacrylic acid linked [FeFe] moiety. The [FeFe] biomimetics have been incorporated into micelles and studied in water as hydrogen evolving electrocatalysts.

Development of approaches to enhance the air stability of this class of HER electrocatalytic complexes has proven to be even more challenging as notably most [FeFe]-hydrogenases and [2Fe-2S] biomimetics are deactivated by $O_2$. Recent experiments in the field suggest that neighboring amino groups mitigate this deactivation via the capturing of reduced oxygen species. In addition, use of redox hydrogels has also been shown to be effective in protecting [FeFe]-hydrogenase from $O_2$.

However, there remains a clear need for robust synthetic methods to afford new catalysts with improved catalytic performance in water with air stability. The present invention features an incorporation of a [2Fe-2S] hydrogenase biomimetic into a polymer that affords advances on all of the challenges described above.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

An objective of the present invention is to provide metallopolymer compositions as catalysts (electrocatalysts or photocatalysts) for hydrogen evolution reactions (HER). Embodiments of the invention are given in the dependent claims. Embodiments of the present invention can be freely combined with each other if they are not mutually exclusive.

Diiron-disulfide hexacarbonyl complexes ($Fe_2S_2(CO)_6$) can be selectively functionalized to afford a variety of bonding motifs that readily lend themselves to the formation of metallopolymeric materials. According to some aspects, the present invention features polymers with [2Fe-2S] moieties as HER electrocatalysts. In some embodiments, an active site mimetic is incorporated into metallopolymers via atom transfer radical polymerization (ATRP) with various vinylic monomers to provide well-defined polymers with a site-isolated complex. Without wishing to limit the invention to any theory or mechanism, by site isolating the complex during electrocatalysis, the electrocatalytic lifetimes and stabilities of these mimetic materials are greatly improved.

In one aspect, the HER electrocatalytic metallopolymers are synthesized by the functionalization of [2Fe-2S] complexes with α-haloesters to prepare metalloinitiators for ATRP. Without wishing to limit the invention to any theory or mechanism, this approach allows for diverse functionalization of [2Fe-2S] metallopolymers with well-defined polymers to tune electrocatalyst solubility and improve overall activity by variation of water-soluble, vinylic monomers. Polymers of the desired molecular weights and low molecular weight distribution were obtained using Cu(I) catalysts and active nitrogen ligands at low temperatures. IR spectroscopy was used to confirm retention of the [2Fe-2S] moiety and estimate the $Fe_2S_2(CO)_6$ concentration. Chromatography with UV-Vis detection at 400 nm confirmed covalent attachment of the [2Fe-2S] system to the polymer. Cyclic voltammetry is used to assess the rate of catalysis defined by a turnover frequency (TOF), and the thermodynamic efficiency of catalysis in terms of overpotential ($\eta$). By selecting an appropriate monomer/polymer conjugate around the [2Fe-2S]-complex, the HER electrocatalysts prepared using this methodology demonstrated excellent HER catalysis in neutral water with reduced overpotential for a homogeneous HER catalyst in water, and robust aerobic stability.

As will be described herein, the metallopolymer electrocatalysts have proven to generate $H_2$ in acetonitrile from acetic acid, and in water for the water soluble metallopolymers. In one embodiment, the water soluble metallopolymer based on 2-(dimethylamino)ethyl methacrylate (DMAEMA) appended with alkyl amine groups, at pH 7 generates $H_2$ at rates comparable to platinum under similar conditions, with a modest overpotential, shows no tendency for the catalytic site to aggregate, and exhibits unusual stability under aerobic conditions.

According to other aspects, the present invention features metallopolymeric materials comprising regioregular poly(3-hexylthiphene) (P3HT) and catalytically active diiron-disulfide complexes. These materials enable solar assisted conversion of a proton source, such as for example, thiols, sulfides, and water. The conjugated polymers, such as P3HT, serve as the photosensitizer to promote photoinduced electron transfer to activate the diiron complex which, in the presence of an appropriate proton donor, catalytically generates hydrogen ($H_2$). This coupling of a conjugated polymer to a diiron center and photocatalytic hydrogen generation with this type of diiron catalyst has not been done before.

One of the unique and inventive technical features of the present invention is the use of P3HT as an electron donor to promote a photo-induced reaction. Without wishing to limit the invention to any theory or mechanism, P3HT is likely the optimal polymeric ligand for these materials due to the development of a number of synthetic methods that allow for control of molecular weight/MWD and precise functional group placement. Furthermore, the band edge/frontier orbital energetics for P3HT ligands and $Fe_2S_2(CO)_6$ points to favorable potential gradients to promote photoinduced charged transfer. None of the presently known prior references or work has the unique inventive technical feature of the present invention.

According to some embodiments, the methods described herein utilizes small molecule complexes with unsymmetric ligand coordination via the nucleophilic attack of alkyl/aryl Grignard, or organolithium agents with diiron-disulfide hexacarbonyl ($Fe_2S_2(CO)_6$) followed by treatment of the reactive thiolate with alkyl halides as electrophiles to promote alkylation. Regioregular P3HT is used in the preparation of the metallopolymers, particularly those prepared from Grignard metathesis (GRIM) or other transition metal catalyzed variants of these methods to create P3HT with —MgX chain ends that can react with high efficiency with $Fe_2S_2(CO)_6$. Subsequently, the reactive thiolate form of the P3HT complex can be alkylated with small molecule, or polymers terminated with alkyl halides to form the targeted unsymmetric complex.

In some embodiments, the solubility and chemical environment around the diiron complex can be tuned with the differential incorporation of a second polymeric ligand to impart water solubility to these otherwise hydrophobic ligands. The incorporation of metal centers into polymeric constructs while retaining their initial catalytic activity remains challenging. However, the methods to prepare metallopolymers combining P3HT and other polymers as ligands enable the preparation of novel, metallopolymeric materials that install photocatalytically reactive metal centers. Further still, the polymeric ligands can be used to make metallopolymers to modulate properties and chemical environment around the catalyst.

In one embodiment, the polymeric ligand is a P3HT. The P3HT may be terminated with either —MgBr, or —Li end groups which can be used to ring-open the disulfide bridge in $Fe_2S_2(CO)_6$ and the resulting thiolate intermediate can be alkylated with alkyl halide terminated polymers to form unsymmetric diiron complexes with differential ligation of the Fe centers. Well-defined polymers bearing a terminal alkyl halide can be prepared using either nitroxide mediated polymerizations (NMP) or by end group modification of commercially available polyethylene oxides.

In further aspects, the present invention also investigates iron-phosphorus coordinate motifs by the preparation of phosphine terminated P3HT ligands. The salient feature of these approaches is the ability to prepare well-defined metallopolymers that maintain the photoactivity of the small molecule complexes.

BRIEF DESCRIPTION OF THE DRAWINGS

The features and advantages of the present invention will become apparent from a consideration of the following detailed description presented in connection with the accompanying drawings in which:

FIG. 8 shows GPC data of PMMA-g-[2Fe-2S] with a UV-Vis detector operating at 254 nm, 350 nm, or 400 nm.

FIGS. 9A and 9B show GPC data for PMMA-g-[2Fe-2S] (Mn=7,194 g/mol, Mw/Mn=1.06) and PDMAEMA-g-[2Fe-2S] (Mn=9,500 g/mol, Mw/Mn=1.33), respectively, with a UV-Vis detector operating at 400 nm, which is characteristic of the initiator, but not for PMMA or PDMEAMA polymers.

FIG. 10 is an IR overlay of the initiator, PMMA, PDMAEMA, and PEGMA showing retention of characteristic Fe—CO stretching frequencies.

DESCRIPTION OF PREFERRED EMBODIMENTS

Figure 1:
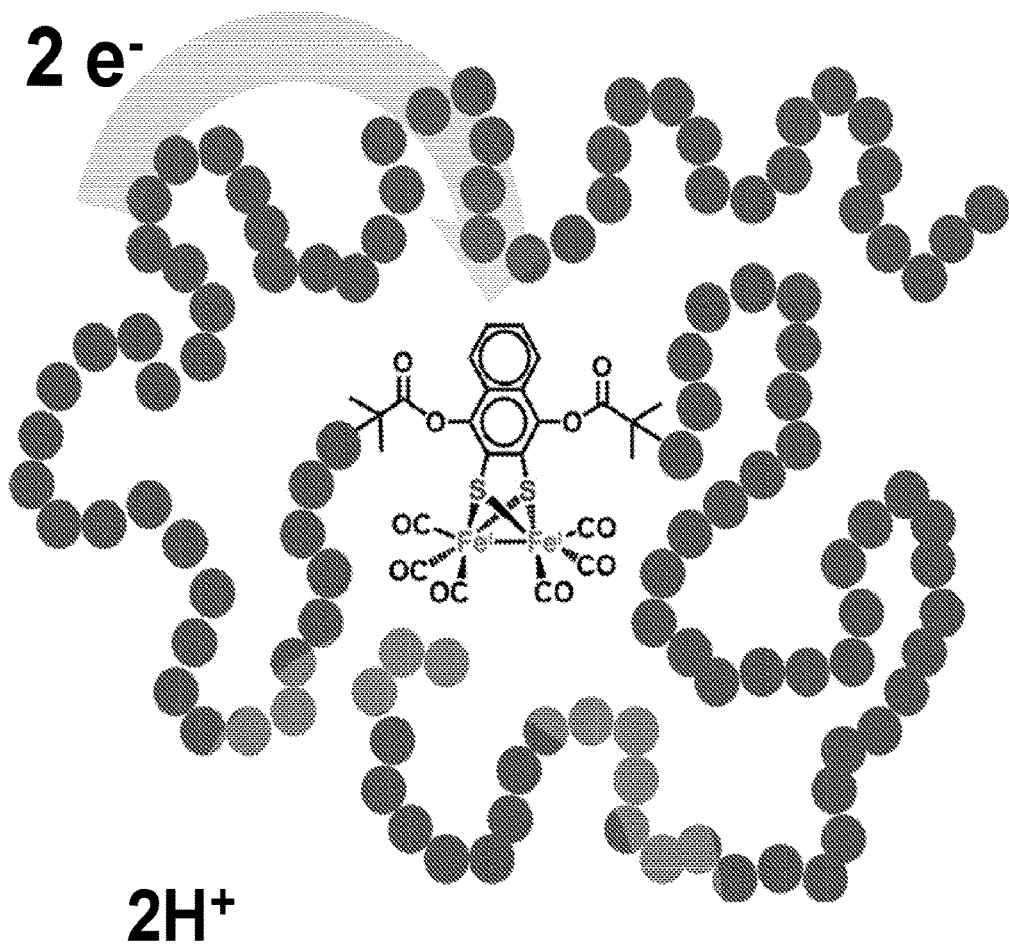
FIG. 1 shows a non-limiting embodiment of a metallopolymer catalyst of the present invention.
Figure 2:
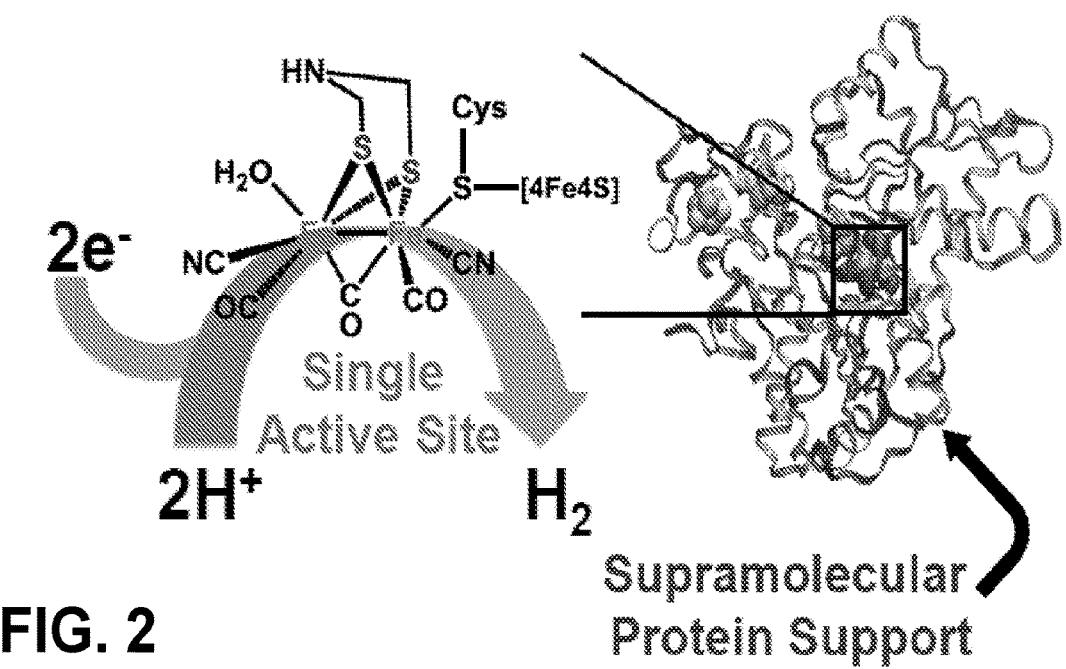
FIG. 2 shows [FeFe]-Hydrogenase, its active site and the elementary reaction for $H_2$ generation.

As known to one of ordinary skill in the art, an atom transfer radical polymerization (ATRP) is a method of controlled radical polymerization (CRP) where an alkyl halide (e.g. R-X, X: Br or Cl) is activated by a transition metal complex (e.g. cuprous halide salts with amine, or N-heterocyclic ligands, such as $Cu^IBr$ with bipyridine ligands) to form an active radical that reacts with a vinyl group (i.e. monomer) and the intermittently formed radical reacts with additional monomer units for propagation to put monomers together in a piece-by-piece fashion. The ATRP method enables the creation of a wide range of polymeric materials with a controlled molecular weight and molecular weight distribution using monomers with different functionalities for specific target applications.

Referring now to FIG. 1-20, in one embodiment, the present invention features an electrocatalytic metallopolymer for generating hydrogen ($H_2$). According to some embodiments, the metallopolymer may comprise an electrocatalytically active complex bonded to a polymer. For example, the metallopolymer may be according to the following: Complex-$L_1$-(Polymer)$_i$, where i may be 1 or 2.

In some embodiments, the electrocatalytically active complex may be the following:

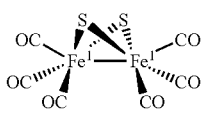

In other embodiments, $L_1$ may be the following:

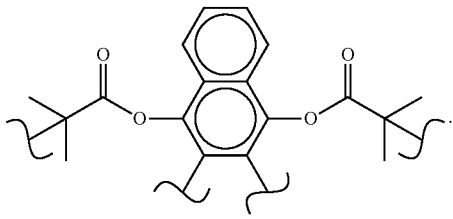

In some embodiments, a phenyl group of $L_1$ may be bonded to the complex. For example, the phenyl group of $L_1$ may be bonded to the disulfide group of the complex.

In still other embodiments, the polymer may be according to the following:

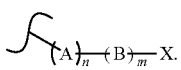

In some embodiments, X may be I, Br or Cl. In some embodiments, m and n can each range from about 1-1,000. In other embodiments, A and B may each be derived from an unsaturated monomer. In one embodiment, A may be identical to B. In an alternative embodiment, A may be different from B. In preferred embodiments, the polymer can impart water solubility to the metallopolymer. Further still, the polymer can function to site-isolate the complex during electrocatalysis, thus improving the electrocatalytic lifetime and stability of the metallopolymer.

According to other embodiments, the electrocatalytic metallopolymer for generating hydrogen ($H_2$) may comprise a metallopolymer complex according to Formula 1:

(Formula 1)

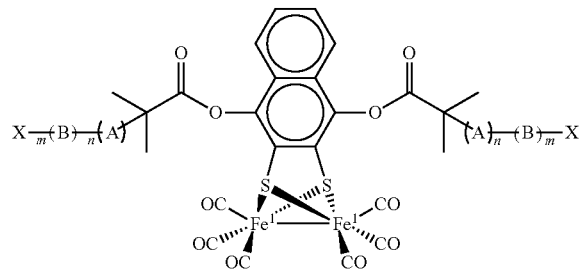

In some embodiments, X may be I, Br or Cl. In some embodiments, m and n can each range from about 1-1,000. In other embodiments, A and B may each be derived from an unsaturated monomer. In one embodiment, A may be identical to B. In an alternative embodiment, A may be different from B.

Consistent with any embodiment of the metallopolymer, the unsaturated monomer may be water-soluble. In one embodiment, the unsaturated monomer may be a vinylic monomer. In some embodiments, the vinylic monomer may be a styrenic monomer, a methacrylate monomer, an acrylate monomer, or functional analogues thereof. For example, the vinylic monomer may be methyl methacrylate, 2-(dimethylamino)ethyl methacrylate, poly(ethylene glycol) methacrylate, styrene (Sty), Sty-$SO_3$Na, or Sty-$NR_2$, where $R_2$ is H or $CH_3$.

In other embodiments, the vinylic monomer may comprise a functional water-soluble group that imparts water solubility to the metallopolymer. Non-limiting examples of the functional water-soluble group include alcohols, amines, amides, esters, carboxylic acids, sulfonic acids, ammonium groups, carboxylate groups, sulfonate groups, or ether groups. In some embodiments, the ether group may be an oligo(ethylene glycol) or a poly(ethylene glycol).

According to yet other embodiments, the electrocatalytic metallopolymer for generating hydrogen ($H_2$) may comprise a metallopolymer complex according to Formula 2:

(Formula 2)

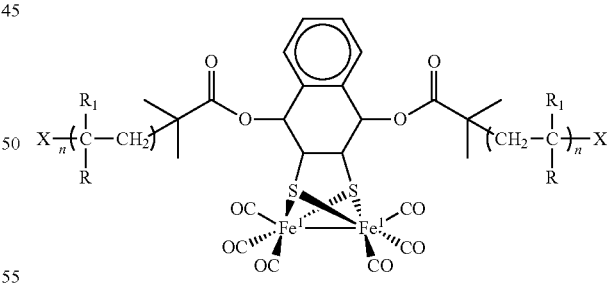

In some embodiments, X may be I, Br or Cl. In some embodiments, n can range from about 1-1,000. In other embodiments, R may be Ph, Ph-$NR_2$, Bn-$NR_2$, Ph-$SO_3$Na, $COOCH_3$, COOBn, $COO(CH_2)_2N(CH_3)_2$, $COO(CH_2)_2N(CH_2CH_3)_2$ or $COO((CH_2)_2O)_mCH_3$. In further embodiments, $R_1$ and $R_2$ may individually be H or $CH_3$. In still further embodiments, m can range from about 1-100.

Examples of the metallopolymer complex according to Formula 1 or 2 include, but are not limited to, the following:
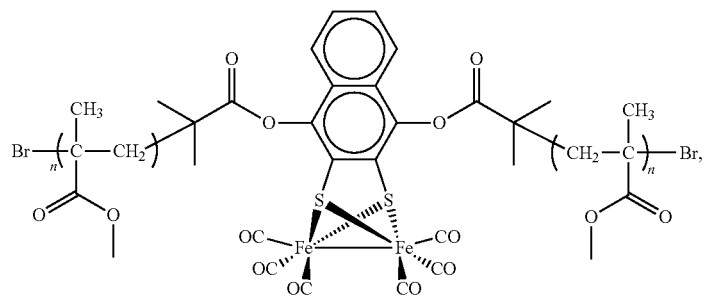
(PMMA-g-[2Fe-2S])
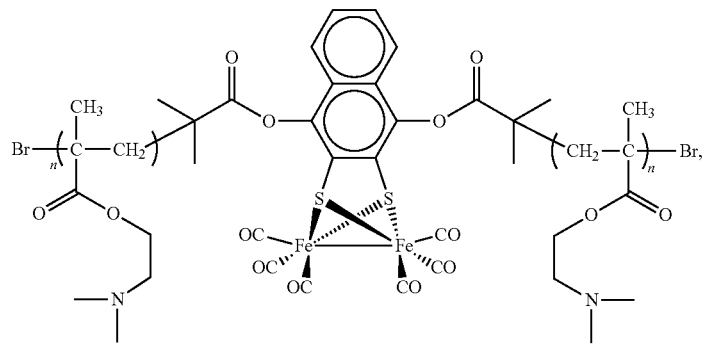
(PDMAEMA-g-[2Fe-2S])
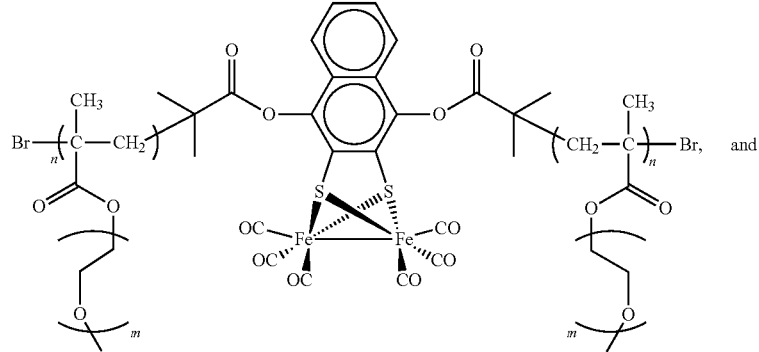
(PEGMA-g-[2Fe-2S])     and
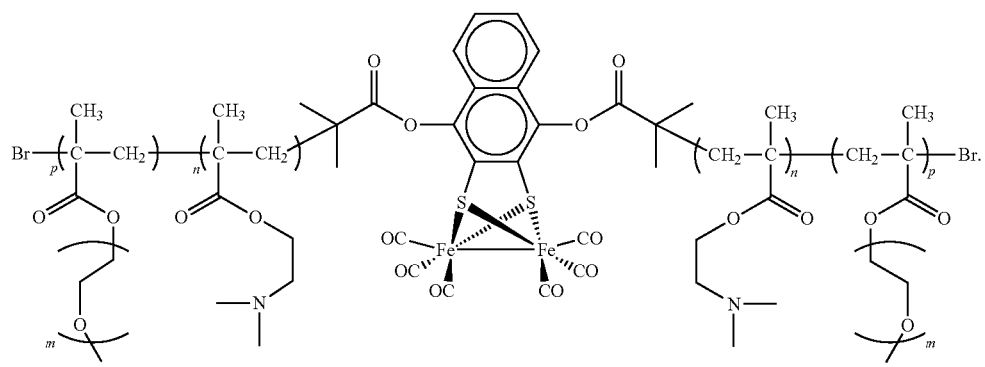
(PDMAEMA-r-PEGMA)-g-[2Fe-2S] Random Copolymer In accordance with the aforementioned examples, m can range from about 1-100. In some embodiments, n and p can each range from about 1-1,000.

Consistent with any of the electrocatalytic metallopolymers described herein, the metallopolymer complex may be soluble in organic or aqueous solutions. In preferred embodiments, the metallopolymer complex is preferably capable of generating Hz from the organic or aqueous solutions. In other preferred embodiments, the metallopolymer complex may be stable when exposed to an aerobic environment. For example, the metallopolymer complex can maintain stability when exposed to the aerobic environment, such as $O_2$ bubbles, during Hz generation.

In some embodiments, the metallopolymer complex may have an Mw:Mn ratio that is less than about 1.3. For example, the Mw:Mn ratio can range from about 1.01 to 1.30 In other embodiments, the metallopolymer complex may have a high turnover frequency. For example, the turnover frequency may be at least about $10^3$ k(s$^{-1}$) in water. In further embodiments, the metallopolymer complex may have an overpotential of at most about 700 mV in water.

Since, in one aspect, the present invention provides electrocatalytic metallopolymers for generating $H_2$, it is another objective of the present invention to provide methods for generating molecular hydrogen ($H_2$). In one embodiment, the method may comprise providing any of the electrocatalytic metallopolymers described herein, adding the electrocatalytic metallopolymer to an organic or aqueous electrolyte solution to form an electrocatalytic mixture, and performing electrolysis using the electrocatalytic mixture. Without wishing to be bound by a particular theory or mechanism, the electrocatalytic metallopolymer can accept electrons from a cathode, thereby generating a reduced form of the electrocatalytic metallopolymer, which is then protonated by some protic species in solution. Thus, the protons in the electrolyte solution are reduced to produce Hz. Examples of the electrolyte solution include, but are not limited to, water, tetrahydrofuran, acetonitrile, alcohol, ammonium, alkyl ammoniums, sulfonic acids, carboxylic acids, or combinations thereof.

According to other embodiments, the present invention may feature methods of producing any of the electrocatalytic metallopolymers described herein. In some embodiments, the method may comprise providing a metalloinitiator according to the following structure:

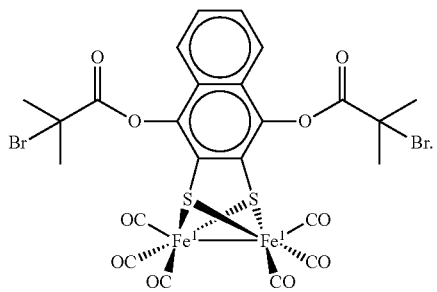

In some embodiments, the metalloinitiator is prepared by providing α-bromoisobutyryl bromide (BIBB) and a hydroquinone complex according to the following structure:

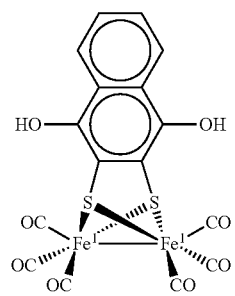

The hydroquinone complex and BIBB may be combined and mixed together so that the BIBB esterifies the hydroquinone complex to produce the metalloinitiator.

After providing a metalloinitiator, the method may further comprise providing an unsaturated monomer, providing a transition metal catalyst, providing a ligand, mixing the transition metal catalyst and ligand to form a metal-ligand catalyst, and mixing and heating the metalloinitiator, unsaturated monomer, and metal-ligand catalyst to activate an atom-transfer radical-polymerization (ATRP) reaction, thereby forming the electrocatalytic metallopolymer. In some embodiments, the transition metal catalyst may comprise a copper complex such as Cu(I)Br. In other embodiments, the ligand may be N,N,N',N'',N''-pentamethyldiethylenetriamine, 1,1,4,7,10,10-hexamethyltriethylenetetramine, or 4,4'-dinonyl-2,2'-dipyridyl.

In preferred embodiments, the unsaturated monomer may be water-soluble. In one embodiment, the unsaturated monomer may be a vinylic monomer. In some embodiments, the vinylic monomer may be a styrenic monomer, a methacrylate monomer, an acrylate monomer, or functional analogues thereof. For example, the vinylic monomer may be methyl methacrylate, 2-(dimethylamino)ethyl methacrylate, poly (ethylene glycol) methacrylate, styrene (Sty), Sty-SO$_3$Na, or Sty-NR$_2$, where R$_2$ is H or CH$_3$.

In other embodiments, the vinylic monomer may comprise a functional water-soluble group that imparts water solubility to the metallopolymer. Non-limiting examples of the functional water-soluble group include alcohols, amines, amides, esters, carboxylic acids, sulfonic acids, ammonium groups, carboxylate groups, sulfonate groups, or ether groups. In some embodiments, the ether group may be an oligo(ethylene glycol) or a poly(ethylene glycol).

In further embodiments, the electrocatalytic metallopolymers of the present invention may be disposed or incorporated into a chromophore. Without wishing to limit the invention to a particular theory or mechanism, this incorporation of the metallopolymers into chromophores may advantageously allow for photocatalysis using said metallopolymers to generate $H_2$. For instance, the metallopolymers in the chromophores may be exposed to a light source, such as UV or visible light, which initiates the HER.

Electrocatalyst Examples

The following are non-limiting examples of the present invention. It is to be understood that said examples are provided for the purpose of demonstrating the present invention in practice, and is in no way intended to limit the invention. Equivalents or substitutes are within the scope of the invention.

In some embodiments, the strategy for incorporation of [2Fe-2S] complexes into polymer architectures comprises the synthesis of a difunctional ATRP initiator bearing the [2Fe-2S] moiety. A difunctional initiator allows for polymer growth from both sides of the complex, ideally giving a central active site protected from known associative reactions. With this modular approach, the synthesis of many different polymeric systems around a common [2Fe-2S] core makes it possible to tune the polymer architecture to improve catalysis via modulation of the secondary coordination sphere by including flexible R—NMe$_2$ groups.

Experimental

All synthesis and electrochemical experiments were carried out under an atmosphere of argon and using anhydrous, deoxygenated solvents and Schlenk techniques unless otherwise noted. Cyclic voltammetry experiments were performed with a Gamry Reference 3000 or Gamry Reference 1000 was used for the collection of all electrochemical data. All potentials in acetonitrile (ACN) were referenced to the Fc/Fc+ couple. Potentials in water are referenced to SHE using the standard conversion of 0.210 V vs. Ag/AgCl/3M KCl. The working electrodes (3 mm PEEK-encased glassy carbon and 1.5 mm PEEK encased Pt, BASi) were polished using a Buehler microcloth with 1.0 then 0.05µ alumina micropolish suspended in de-ionized water, then briefly (ca. 10 s) sonicated in distilled water. A Pt mesh was used as the counter-electrode. A silver wire in 0.01 M AgNO$_3$ was used as a reference electrode in acetonitrile. A silver wire coated with a layer of AgCl suspended in 3.0 M KCl was used for water experiments. In both cases the reference electrode was separated from the analyte solution by a Vycor frit.

Synthesis of [2Fe-2S]-Initiator [µ-2,3-(naphthalene-1,4-diyl bis(2-bromo-2-methylpropanoate) dithiolato]bistricarbonyliron (5)

Figure 3:
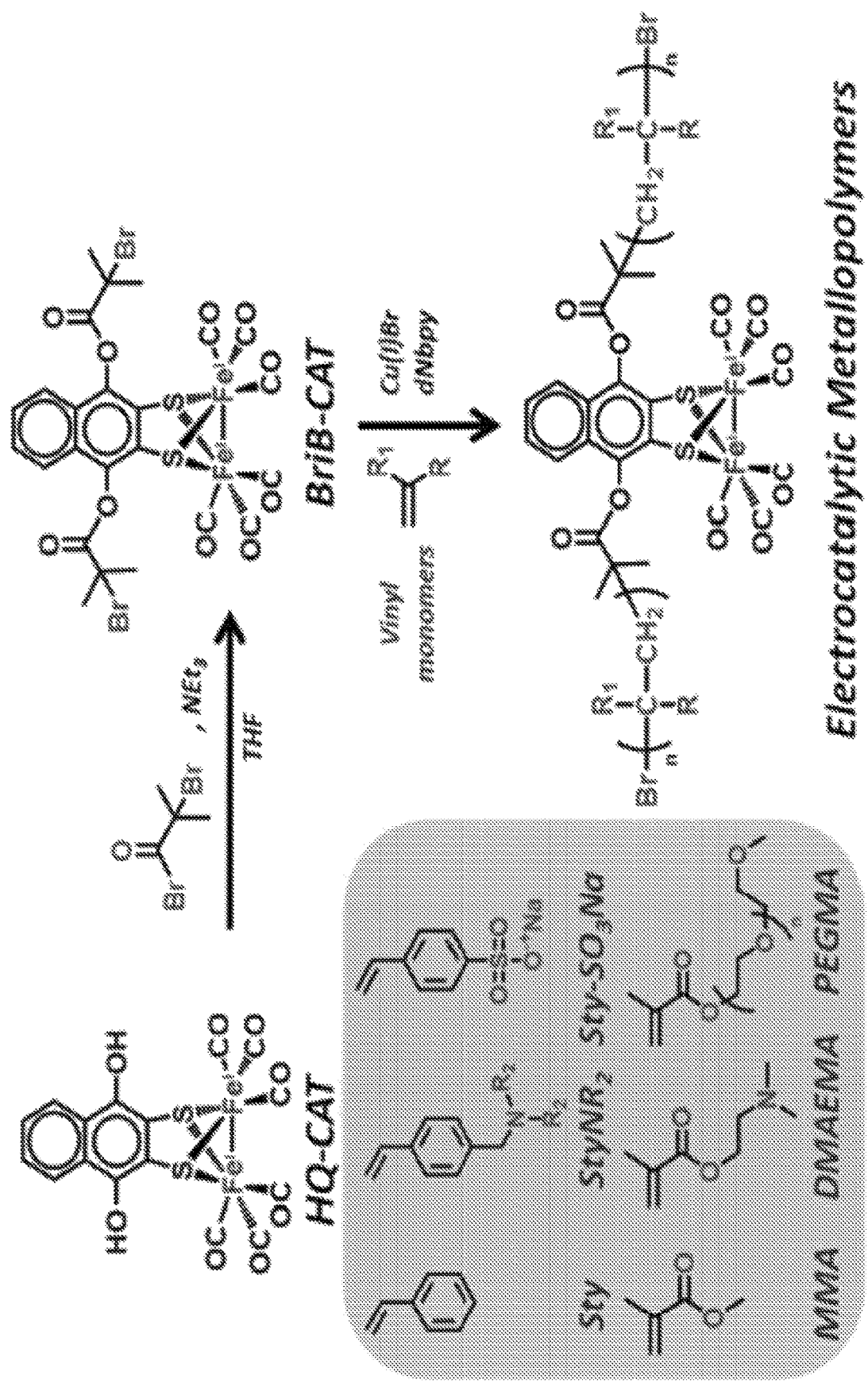
FIG. 3 shows a reaction scheme for synthesizing the metalloinitiator and the metallopolymer. Non-limiting examples of vinylic monomers to prepare the metallopolymer are also shown.

Referring to FIG. 3, metalloinitiator 5 for ATRP was prepared in three steps starting with the known complex NHQ-CAT. Sufficient NaCNBH$_3$ (2.26 mg, 0.036 mmol) was added to NHQ-CAT (45 mg, 0.90 mmol) in THF (2 mL) to reduce the quinone and the solution was stirred at room temperature for 2 h. Triethylamine (TEA) (75 µL, 0.54 mmol) was then added via micro syringe and the solution was stirred for 20 minutes. α-Bromoisobutyryl bromide (BIBB) (30 µL, 0.22 mmol) was added for esterification of NHQ-CAT via micro syringe and the solution was stirred at room temperature for 2.25 h. The reaction was filtered to remove precipitate and solvent removed by rotary evaporation (23° C., ca. 200 torr) to yield a red/orange solid. Purification via column chromatography on silica gel (30% DCM in hexane) gave 63 mg of 5 (0.079 mmol, 87%) as a powdery orange solid upon removal of solvent. This solid was recrystallized via layering of toluene/MeOH to obtain crystals for electrochemical experiments and polymer synthesis. The structure of metalloinitiator 5, shown in FIG. 6, was unequivocally confirmed by single crystal X-ray crystallography. $^1$H NMR: (CDCl$_3$, 500 MHz, 298 K) δ (ppm) 7.81 (2H, dd J=6.5, 3.4 Hz) 7.49 (2H, dd J=6.5, 3.4 Hz), 2.19 (12H, s) $^{13}$C NMR: (CDCl$_3$, 125 MHz, 298 K) δ (ppm) 206.8 (OC—Fe), 168.3 (C=O), 143.0 (C$_{1,4-O}$), 134.8 (C$_{,2,3-S}$), 129.1 (C$_{6,7-H}$), 128.1 (C$_{9,10}$), 121.9 (C$_{5,8-H}$), 54.8 (CH—Br), 31.0 (CH$_3$) IR (CHCl$_3$, thin film on NaCl): 3688 cm$^{-1}$ (w), 3619 cm$^{-1}$ (w, C$_{sp2}$—H), 3154 cm$^{-1}$ (w, C$_{sp2}$—H), 3019 cm$^{-1}$ (vs, Csp2-H), 2976 cm$^{-1}$ (w, Csp3-H), 2082 cm$^{-1}$ (Fe—CO, s), 2050 cm$^{-1}$ (Fe—CO, s), 2012 cm$^{-1}$ (Fe—CO, s) 1760 cm$^{-1}$ (C=O ester, w), 1522 cm$^{-1}$ (C=C, w), 1423 cm$^{-1}$ (C—H, w), 1210 cm$^{-1}$ (C—O, vs)

Synthesis of [2Fe-2S] Metallopolymers via ATRP

The growth of well-defined (co)polymers from the [2Fe-2S] metalloinitiator 5 via ATRP is a unique method among polymeric-[2Fe-2S] systems as it provides a facile method to tune the environment around the catalyst core in a single step by variation of comonomer feed and chain length of the covalently tethered macromolecules without post-polymerization modification. The synthesis of metallopolymers was initially investigated by the ATRP of methyl methacrylate (MMA) to confirm the chemical tolerance of the [2Fe2S] complex to polymerization conditions and facilitate characterization of metallopolymers using conventional polymer solution characterization in non-polar media.

PMMA-g-[2Fe-2S] Metallopolymers

Figure 4:
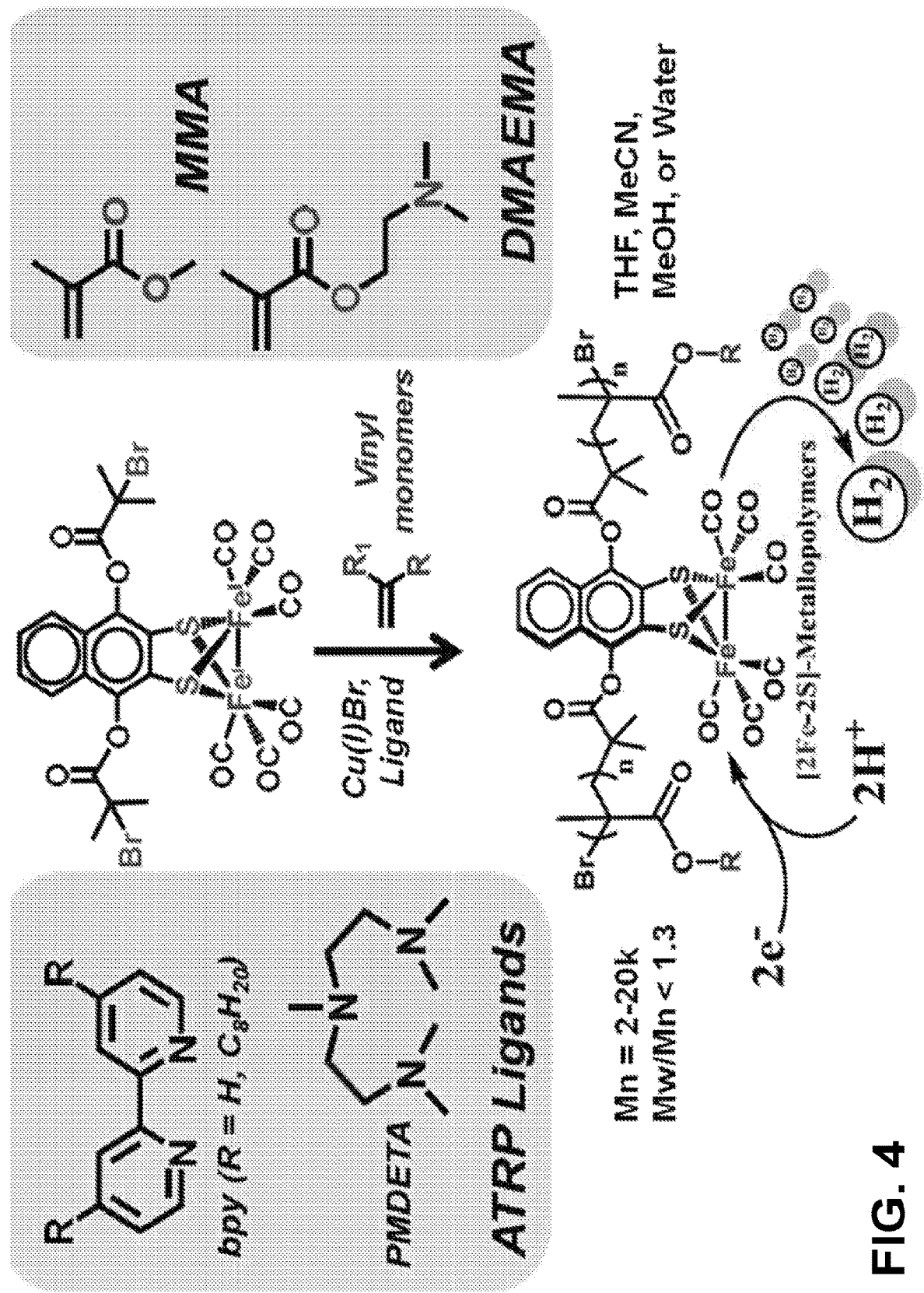
FIG. 4 shows a reaction scheme for synthesizing the metallopolymer via ATRP. Non-limiting examples of ATRP ligands and vinylic monomers to prepare the metallopolymer are also shown.
Figure 5:
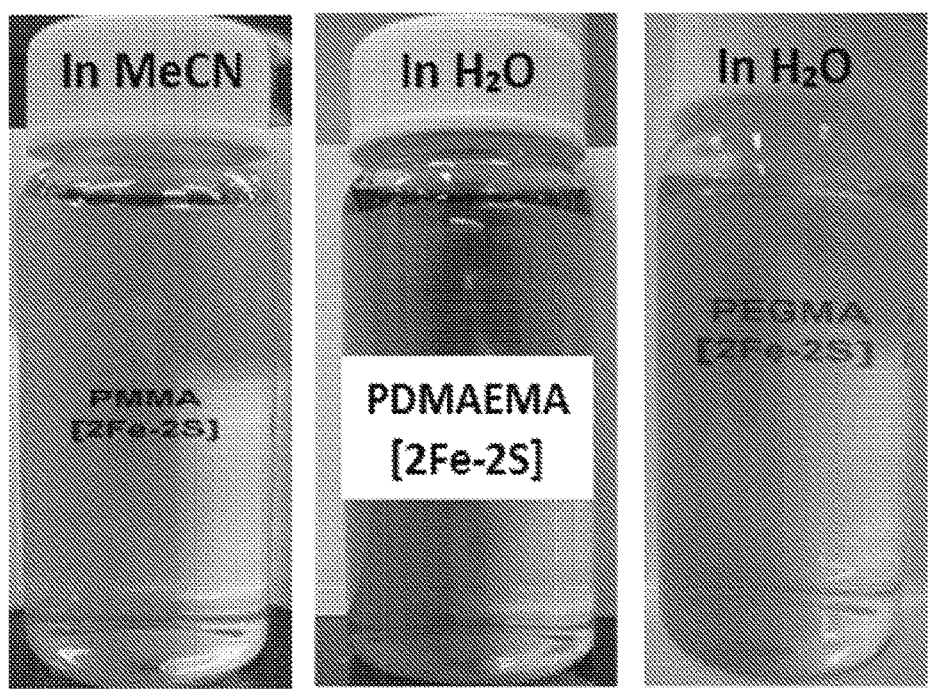
FIG. 5 shows homogeneous methacrylate-based, polymer-supported electrocatalysts, PMMA-g-[2Fe-2S] in organic media, PDMAEMA-g-[2Fe-2S] and PEGMA-g-[2Fe-2S] in aqueous media.
Figure 6:
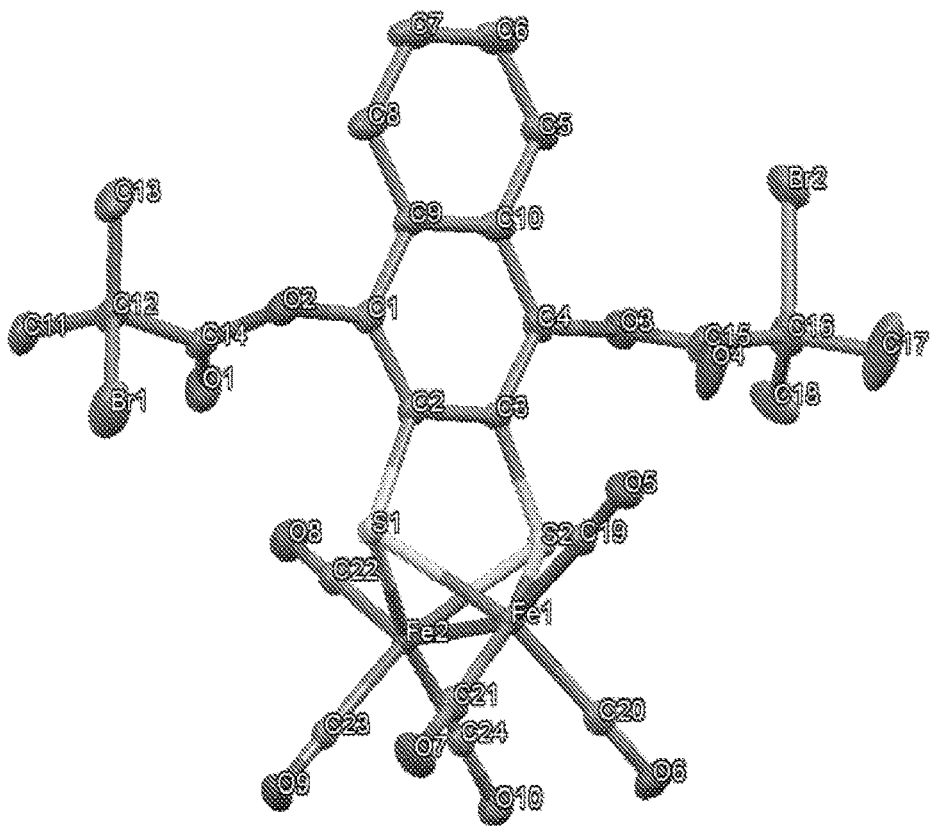
FIG. 6 shows an ORTEP diagram of the initiator with hydrogen atoms omitted and thermal ellipsoids shown at 50% probability level.
Figure 7:
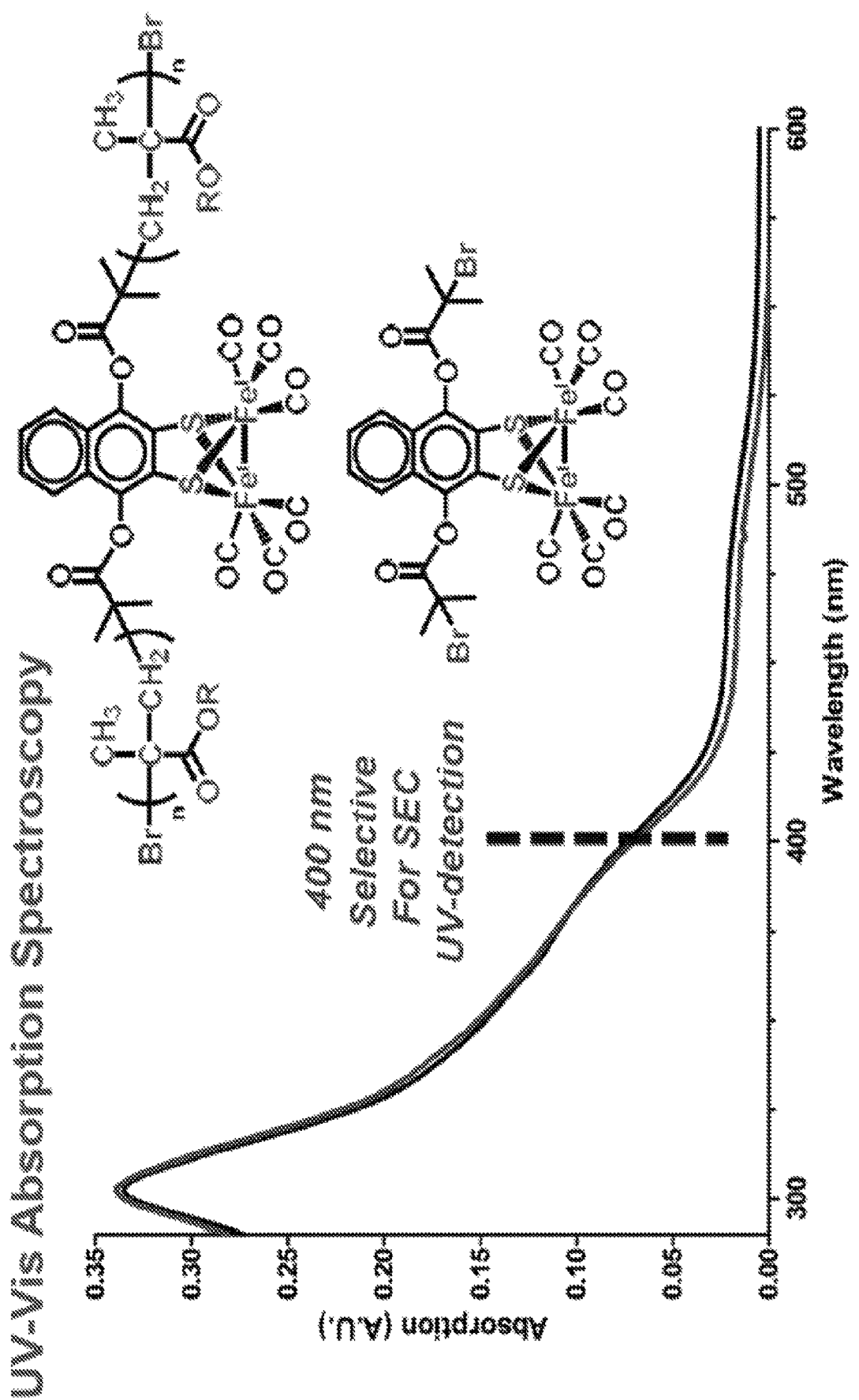
FIG. 7 shows UV-Vis absorption spectra of the ATRP metalloinitiator and a PMMA-g-[2Fe-2S] metallopolymer in toluene. The PMMA-g-[2Fe-2S] metallopolymer was made using the ATRP metalloinitiator.
Figure 11:
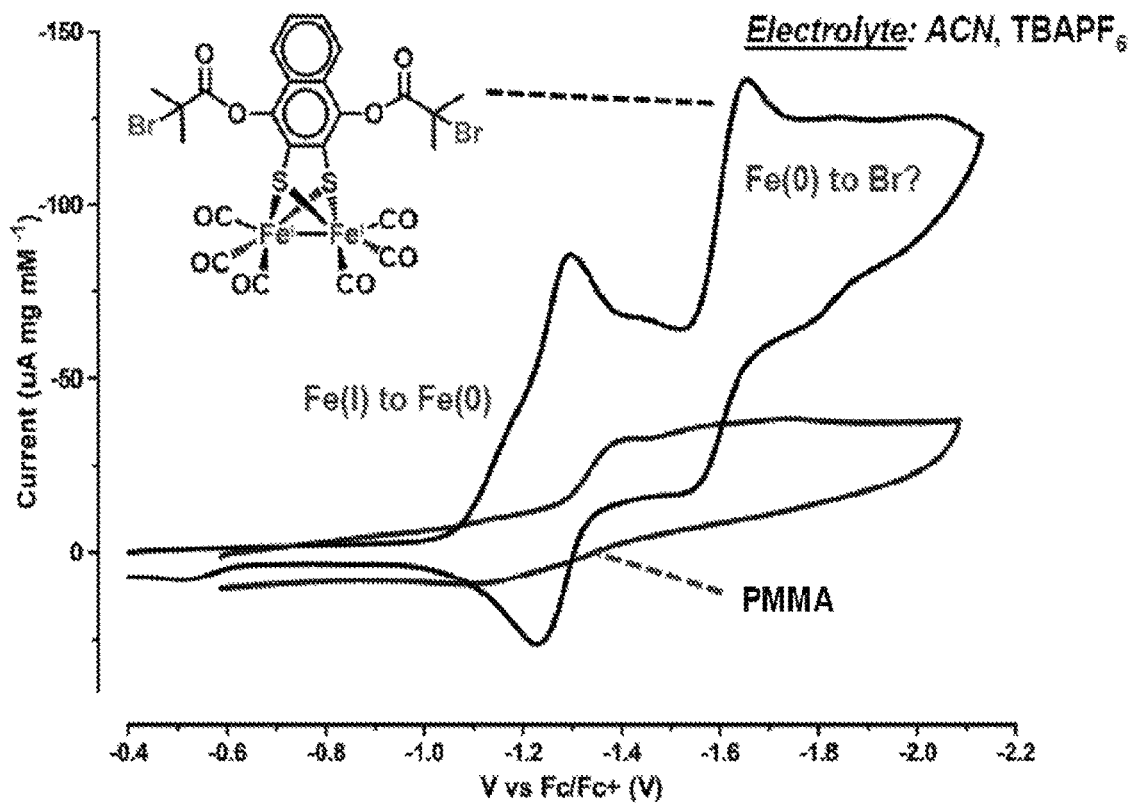
FIG. 11 shows cyclic voltammetry (CV) of the metalloinitiator and PMMA-g-[2Fe-2S] in acetonitrile to observe Fe(I) to Fe(0) reduction in the metallopolymer.
Figure 12:
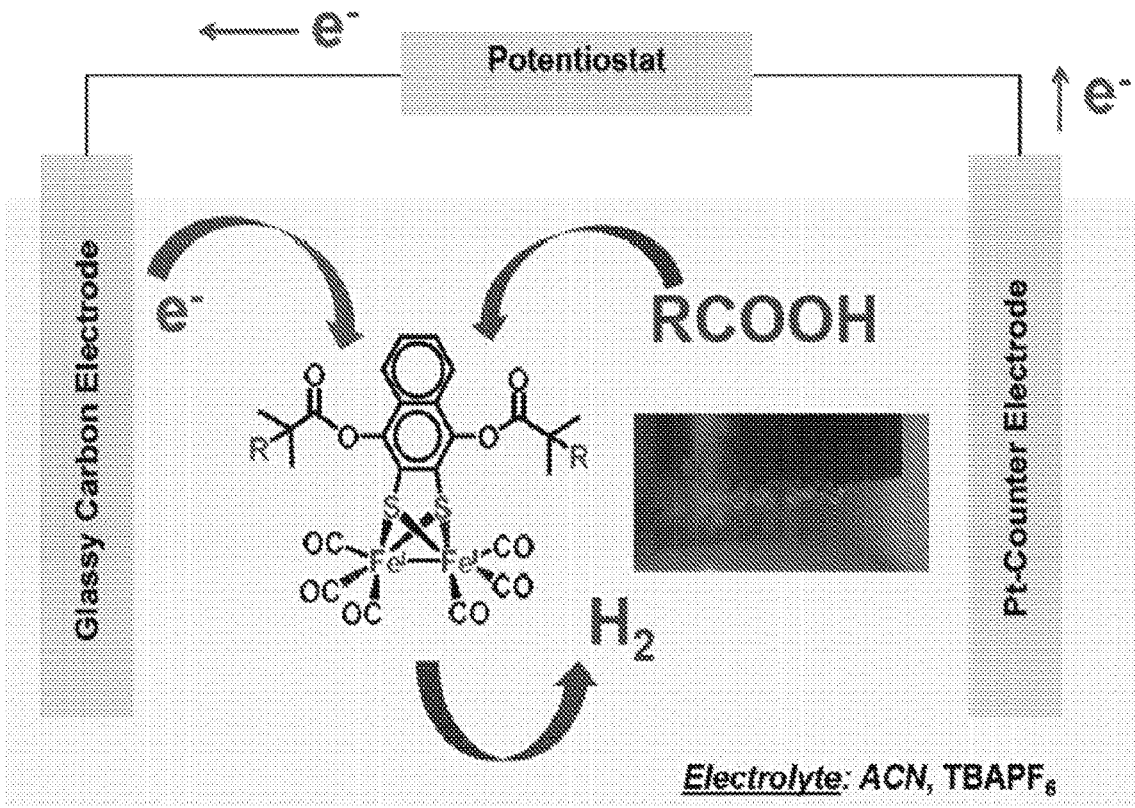
FIG. 12 is an exemplary schematic of a CV experiment to measure current from $H_2$ generation.
Figure 13:
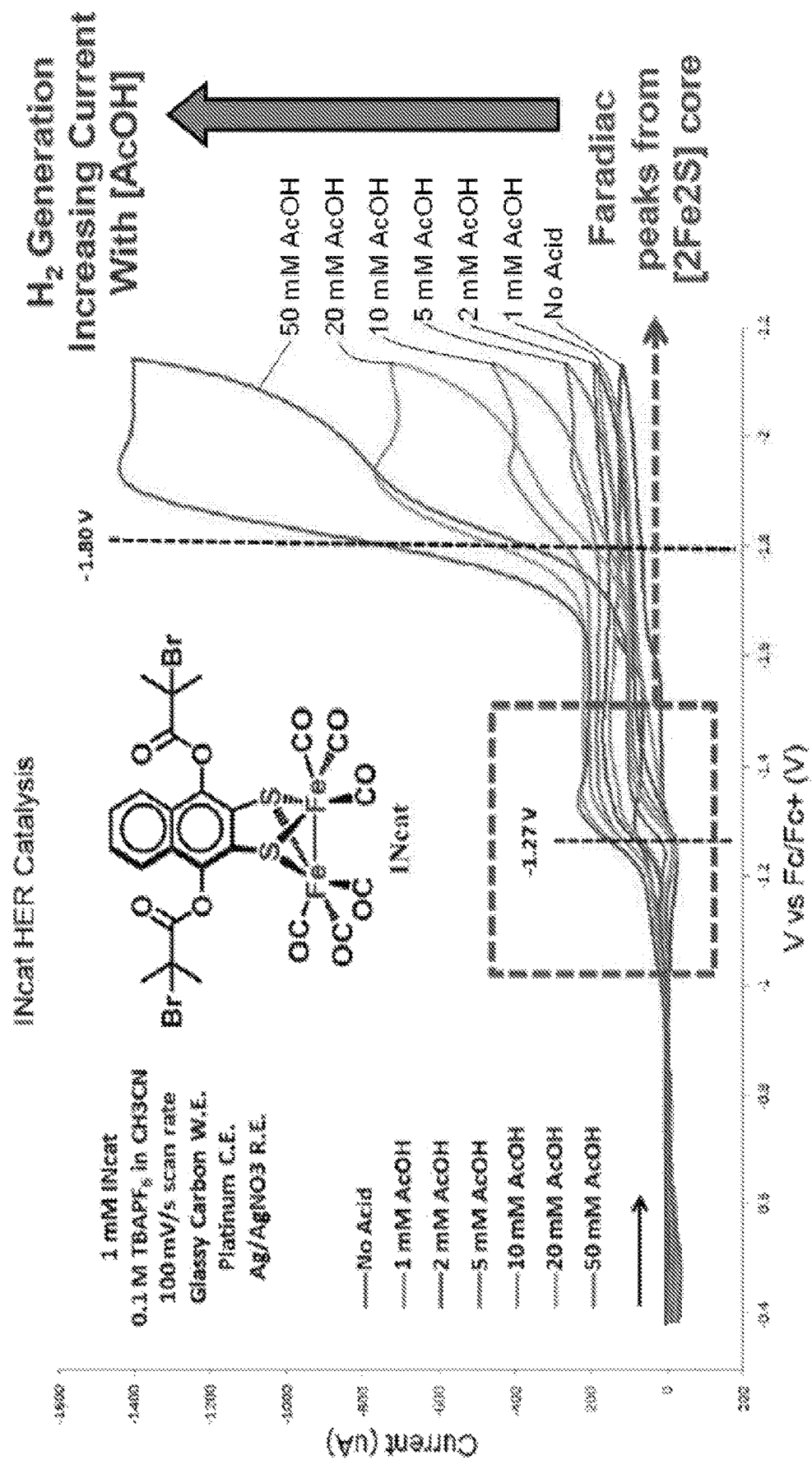
FIG. 13 shows CV electrocatalysis of the metalloinitiator with increasing [AcOH] in acetonitrile.

Referring to FIG. 4, PMMA metallopolymers (PMMA-g-[2Fe-2S]) were prepared using metalloinitiator 5 as a difunctional ATRP initiator with a copper (I) bromide (Cu(I)Br)/4,4'-Dinonyl-2,2'-dipyridyl (dNbpy) catalyst system at 55° C. Molar masses of ca. 10,000 g/mol (i.e., 5,000 g/mol per each initiator site) were targeted to enable sufficient site isolation of the iron complex, while still being amenable to size exclusion chromatography (SEC) and NMR spectroscopy end-group analysis for molecular weight characterization.

Figure 14:
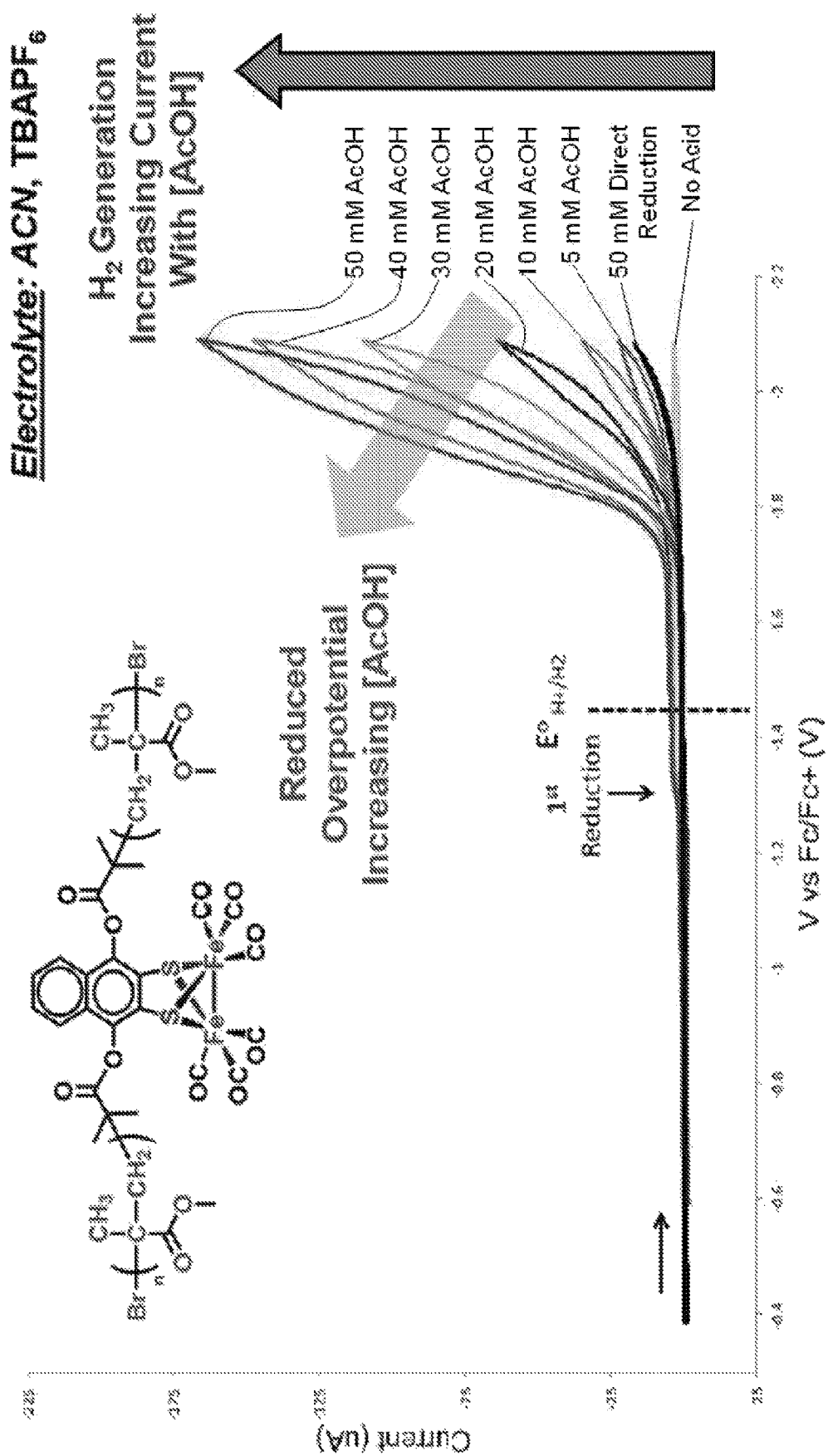
FIG. 14 shows CV electrocatalysis of PMMA-g-[2Fe-2S] with increasing [AcOH] in acetonitrile.
Figure 15:
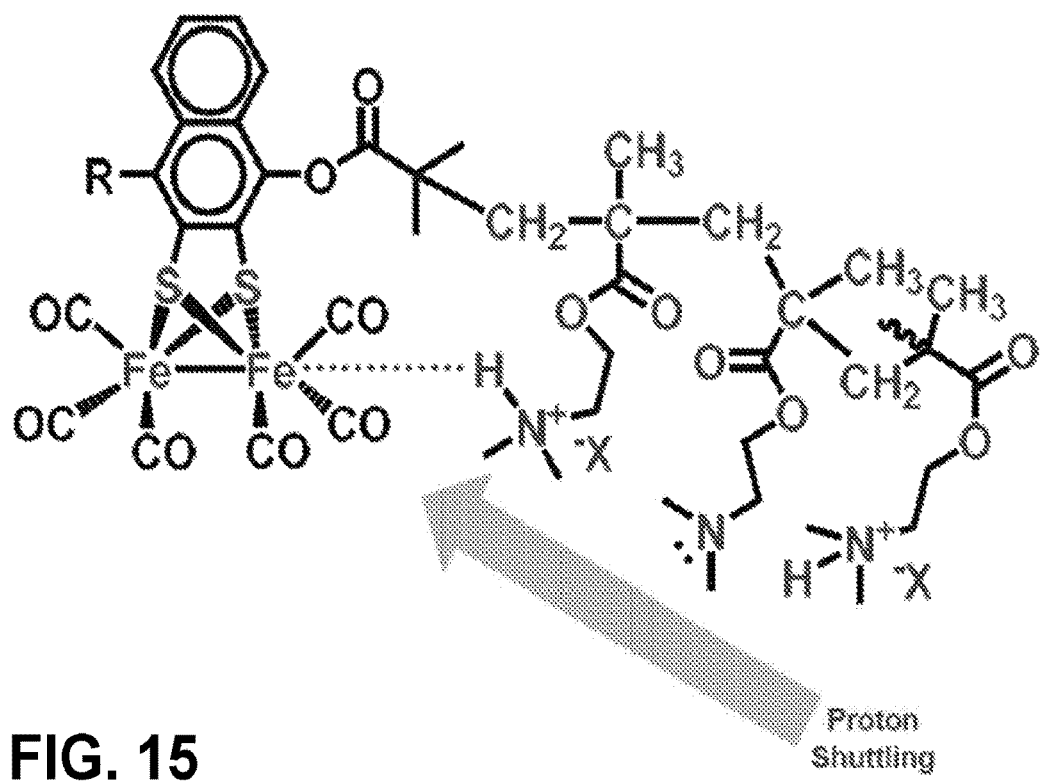
FIG. 15 shows an exemplary scheme of proton shuttling in PDMAEMA-g-[2Fe2S]. The amines in PDMAEMA are partially protonated at neutral pH which may facilitate proton transport and form an H-bond to the Fe—Fe center.

The successful formation of well-defined PMMA-g-[2Fe-2S] metallopolymers ($M_{n,\,SEC}$=11,982 g/mol; $M_w/M_n$=1.10) was confirmed using a combination of IR spectroscopy of the characteristic Fe—CO stretching frequencies (FIG. 10) along with size exclusion chromatography (SEC) in tetrahydrofuran (THF) coupled with UV-vis detection (at 400 nm) (FIG. 9A) and end-group analysis using $^1$H NMR spectroscopy (not shown). Furthermore, PMMA-g-[2Fe-2S] metallopolymers were found to be electrocatalytic active for HER in acetonitrile in the presence of AcOH (FIG. 14).

PDMAEMA-g-[2F-2S] Metallopolymers

Upon structural confirmation that well-defined [2Fe-2S] metallopolymers could be prepared via the ATRP methodology, the preparation of water soluble materials was then pursued, particularly with the aim of engineering the microenvironment around the [2Fe—S2] complex to enhance HER electrocatalysis. To achieve this goal, tertiary amines were incorporated as side chain groups to metallopolymers to impart both water solubility to these complexes, and facilitate proton transfer to the [2Fe-2S] core upon protonation of the amine groups. These metallopolymers were prepared by ATRP of 2-(dimethylamino)ethyl methacrylate (DMAEMA) from metalloinitiator 5 using a Cu(I)Br/N,N,N',N',N'-pentamethyldiethylenetriamine (PMDETA) or Cu(I)Br/1,1,4,7,10,10-hexamethyltriethylenetetramine (HMTETA) catalyst system to afford the PDMAEMA-g-[2Fe-2S] metallopolymer, as confirmed by IR spectroscopy (FIG. 10) and SEC in LiBr-DMF mobile phase ($M_{n,SEC}$=9,500; $M_w/M_n$=1.33; (FIG. 9B). Hence, using this approach, a much higher local concentration of amine groups around the [2Fe-2S] core is created, since every DMAEMA repeating unit carries an amine side chain group, which could be precisely controlled by variation of the degree of polymerization as achieved by ATRP. PDMAEMA metallopolymers in the range of 10,000-15,000 g/mol with low dispersity were prepared and were water soluble, as well as soluble in ACN and DMF.

For ATRP of DMAEMA using 5, a 10 mL Schlenk flask equipped with a Teflon-coated magnetic stir bar was added Cu(I)Br (2.55 mg, 0.0178 mmol), sealed with a rubber septum, evacuated and backfilled with Ar three times. Deoxygenated HMTETA (7.3 µL, 0.0267 mmol) was added to the flask followed by the addition of 0.2 mL of deoxygenated THF via purged syringe. The resulting mixture was stirred for 10 minutes to allow for the formation of the Cu-ligand complex. In a second 10 mL Schlenk flask equipped with a Teflon-coated magnetic stir bar, 5 (14.24 mg, 0.0178 mmol) was added. The flask was sealed with a rubber septum, evacuated and backfilled with Argon three times, and then purified and deoxygenated DMAEMA (0.30 mL, 1.78 mmol) was added via purged syringe, followed by the addition of 0.30 mL of deoxygenated, anhydrous THF. The solution was stirred until homogeneous then transferred to the reaction flask via purged syringe. The flask was placed in an oil bath at 50° C. and stirred for 90 min.

Results

Figure 16:
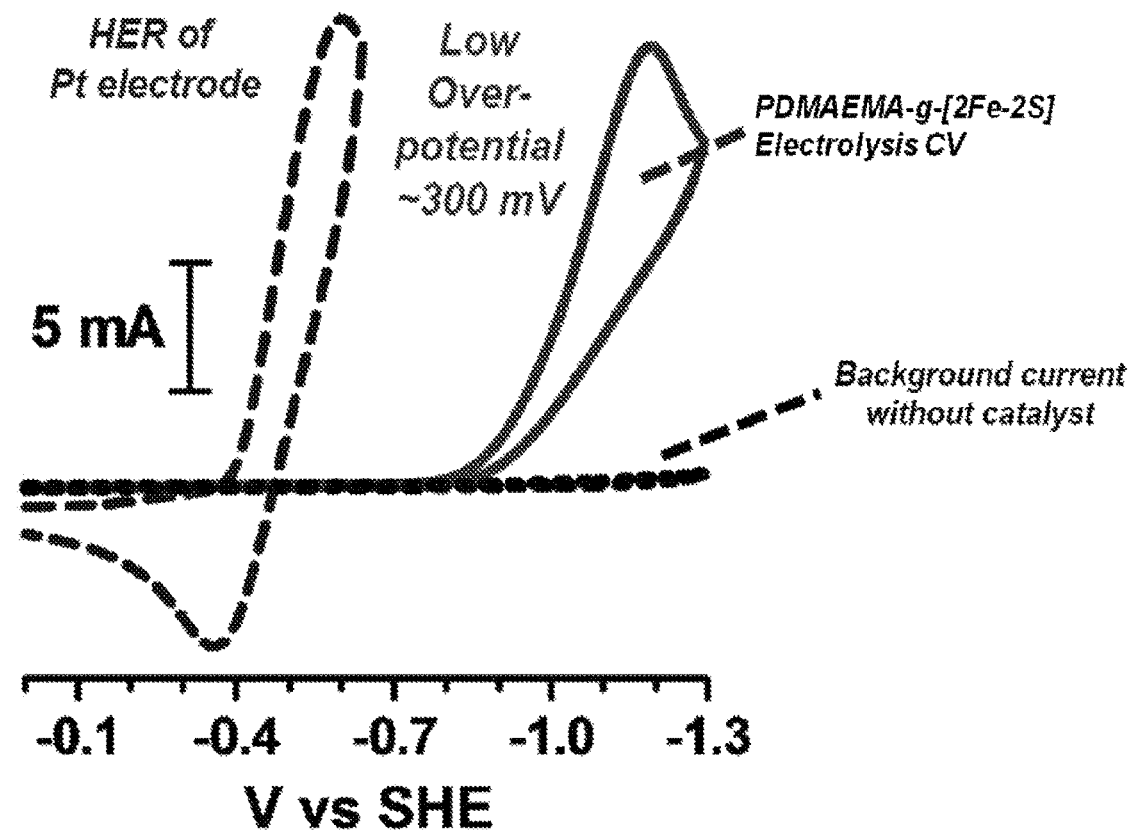
FIG. 16 is a CV current density comparison of 100 μM PDMAEMA-g-[2Fe-2S] metallopolymer to a Pt electrode for $H_2$ generation under identical conditions.
Figure 17:
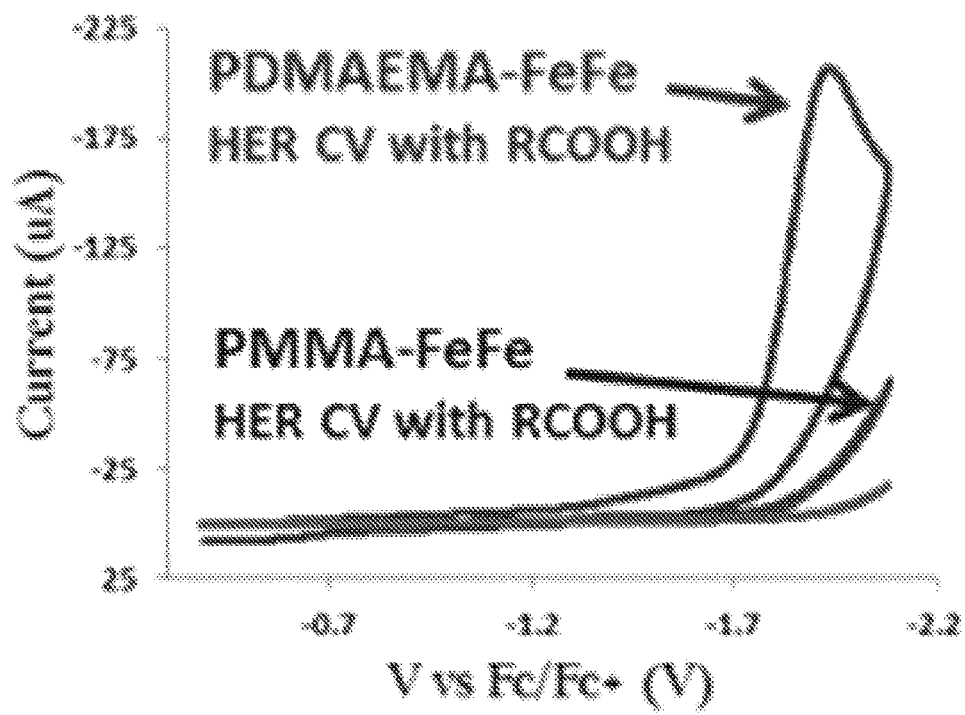
FIG. 17 is a CV current density comparison of PDMAEMA-g-[2Fe-2S] and PMMA-g-[2Fe-2S] metallopolymers for $H_2$ generation under identical conditions.
Figure 18:
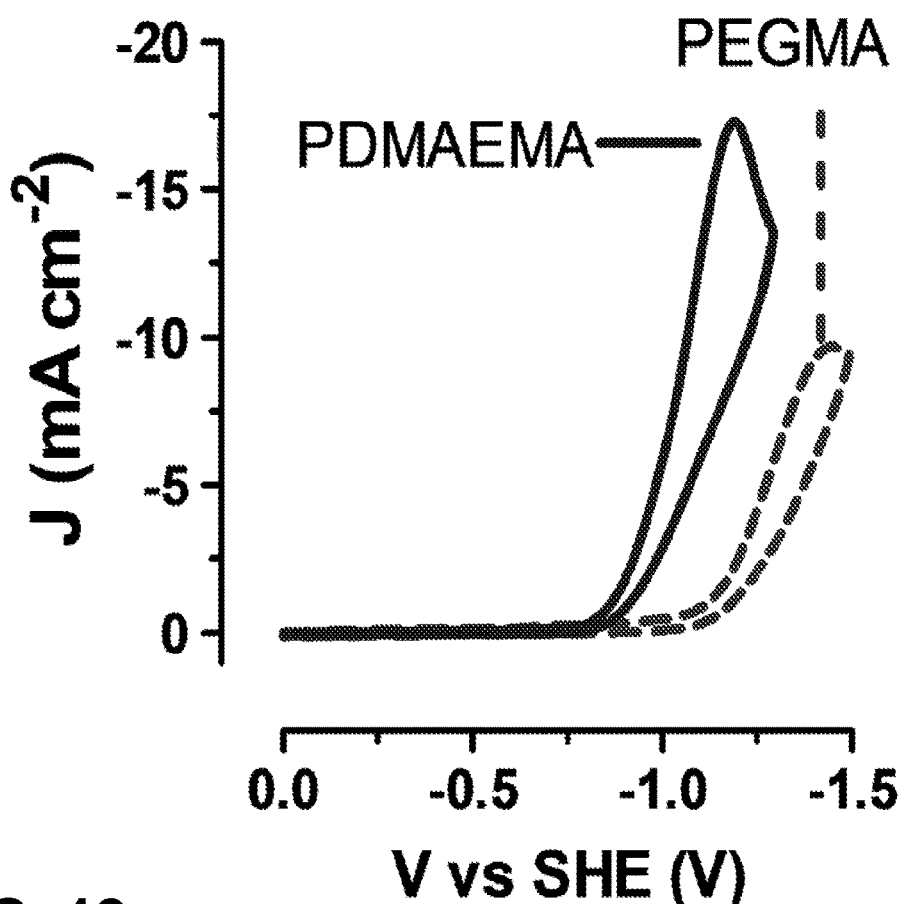
FIG. 18 is a CV current density comparison of 0.10 mM PDMAEMA-g-[2Fe-2S] and 0.52 mM PEGMA-g-[2Fe-2S] metallopolymers to a Pt electrode for $H_2$ generation under identical conditions.
Figure 19:
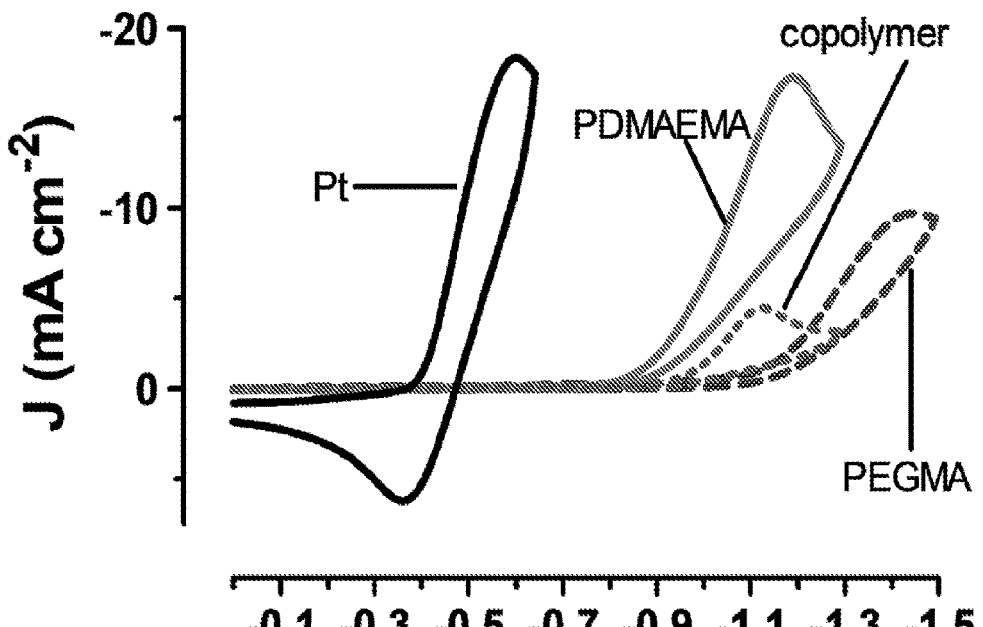
FIG. 19 is a CV current density comparison of 0.1 mM PDMAEMA-g-[2Fe-2S], 0.52 mM PEGMA-g-[2Fe-2S], and 0.2 mM PDMAEMA-r-PEGMA-g-[2Fe-2S] copolymer to a Pt electrode for $H_2$ generation under identical conditions.

Electrocatalytic CV experiments with PDMAEMA-g-[2Fe-2S] metallopolymers were performed in pH 7 neutral water. The PDMAEMA-g-[2Fe-2S] metallopolymer was catalytically active for $H_2$ generation at low potentials ($E_{onset}=-0.85$ V. $E_{1/2}=-1.05$ V, and $E_{ipc}=-1.18$ V, all aqueous potentials reported vs SHE), and modest metallopolymer loadings (1.6 mg/mL). Furthermore, the current densities generated by the PDMAEMA-g-[2Fe-2S] metallopolymer were comparable to that of a Pt electrode for $H_2$ generation under identical conditions (FIG. 16).

Air Stable Metallopolymers for HER.

Figure 20:
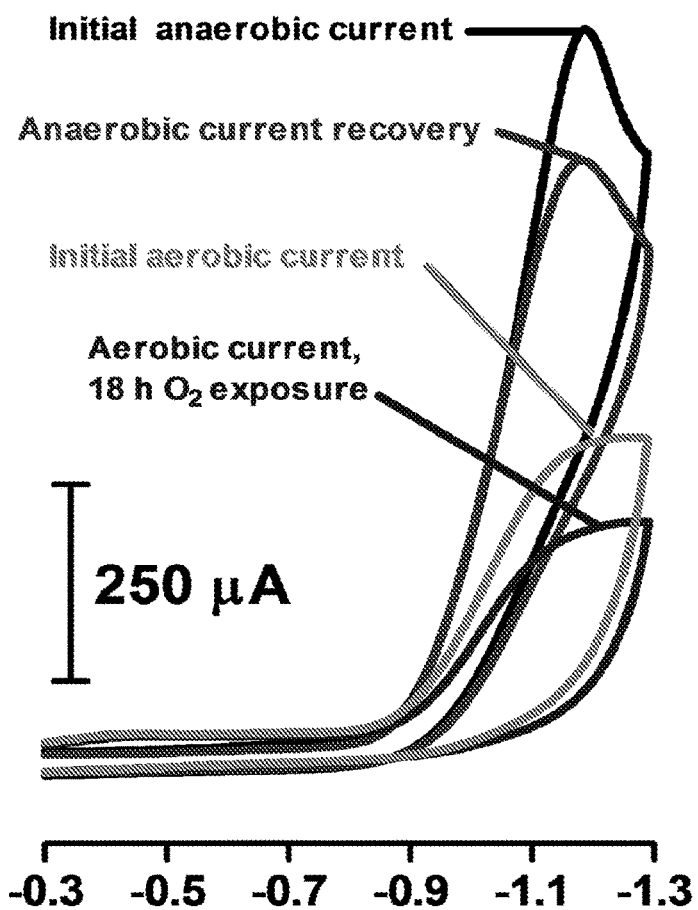
FIG. 20 shows cyclic voltammetry comparison of anaerobic and aerobic activity of PDMAEMA-g-[2Fe-2S] (ca. 50 μM [2Fe-2S] via IR, 2.5 mg/mL). Freshly prepared anaerobic solution, initial aerobic current response, current response after 18 hours of storage under aerobic conditions, and recovery of current upon return to anaerobic conditions. Current has been normalized to current density by dividing by experimentally determined area of the glassy carbon electrode (A=0.07469 $cm^2$).
Figure 21:
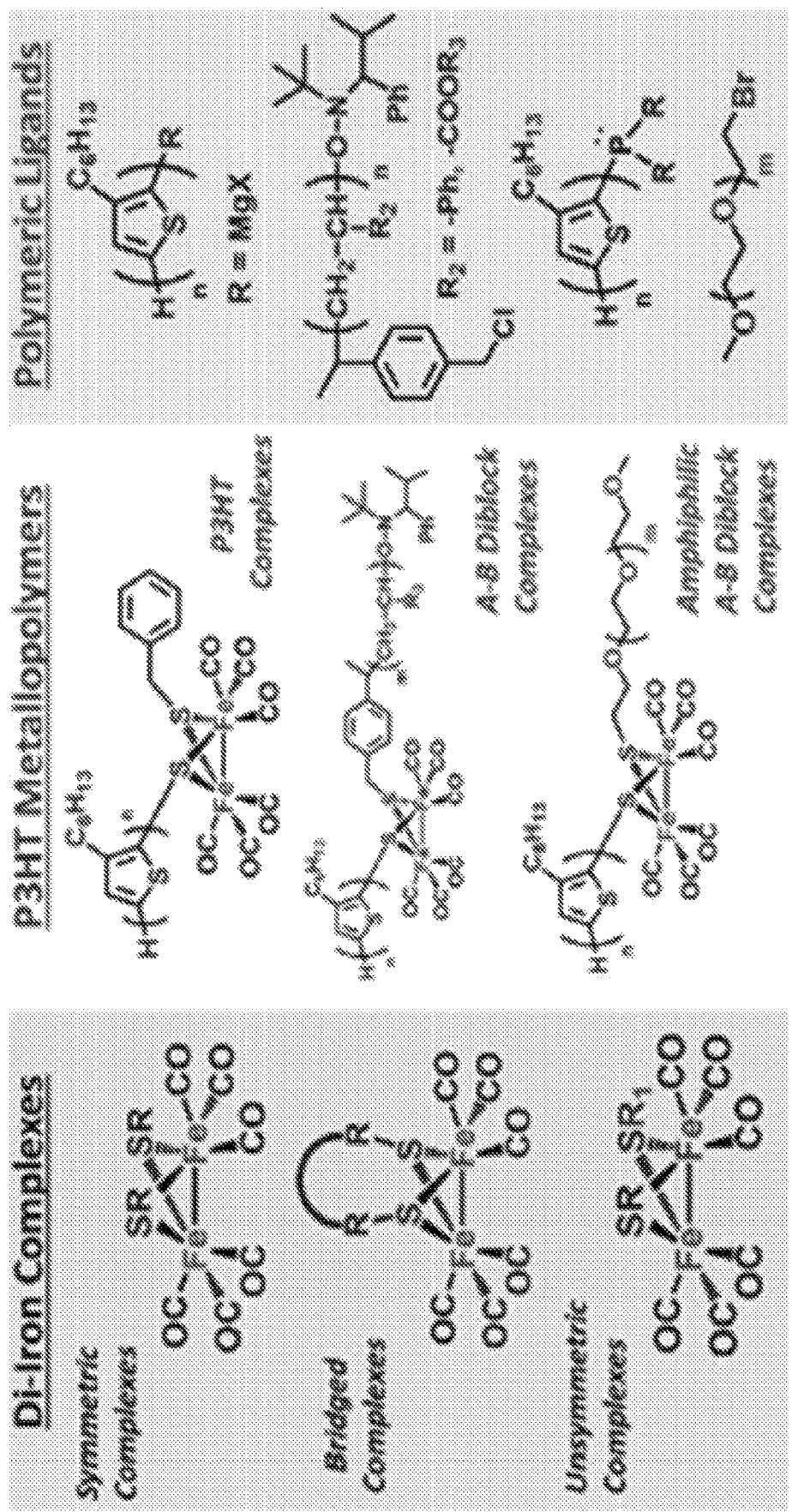
FIG. 21 shows non-limiting examples of metallopolymers that are synthesized using $Fe_2S_2(CO)_6$ complexes with P3HT and other polymeric ligands to enable photogeneration of $H_2$ and alkylation of diiron-disulfide complexes with Grignard, or organolithium reagents and alkyl halides to form unsymmetric complexes, or A-B diblock metallopolymers.
Figure 22:
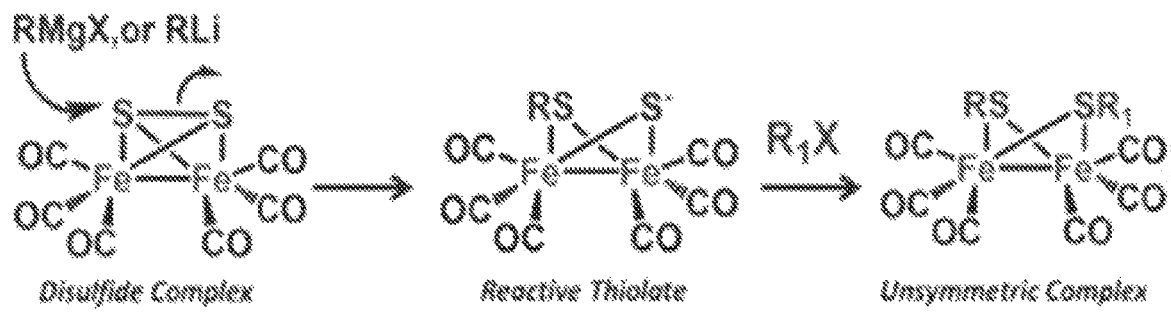
FIG. 22 shows a non-limiting example of a reaction scheme for preparing unsymmetric metallopolymer complexes.

The oxygen sensitivity of PDMAEMA-g-[2Fe-2S] metallopolymers in aqueous media was investigated since it is known that one of the major challenges in developing robust [2Fe-2S] biomimetic catalysts is the poor oxygen stability of these complexes as also encountered in the [FeFe]-hydrogenase enzymes. Referring to FIG. 20, peak catalytic current, $I_{pc1}$ was established for the sample under anaerobic conditions then the solution was bubbled with compressed air (21% $O_2$) for 30 minutes. Cyclic voltammograms of the oxygenated solution showed a peak for $O_2$ reduction (c.a. −0.4 V vs SHE) as well as a catalytic peak which retained 55% (±11%) of the peak catalytic current determined under anaerobic conditions. After storing the aerated solution in ambient conditions for 18 hours, the sample had slightly reduced activity compared with the previous day (39±7% of $I_{pc}$) but sparging with argon for 30 minutes allowed for recovery of 90% (±2%) of $I_{pc}$. Subsequently, a controlled potential Coulometry in a cyclic voltammetry cell was performed with no attempt to separate the catalytic solution from the $O_2$ producing Pt counter electrode. No decay in current was observed over this time period, confirming the aerobic stability of the PDMAEMA-g-[2Fe-2S] system. This level of activity and stability in aerobic solutions is remarkable in light of the fact that oxygen sensitivity is one of the most persistent, unsolved problems plaguing [FeFe]—$H_2$ase mimics.

The previously described example demonstrated a versatile new methodology for the incorporation of catalytic moieties into metallopolymer frameworks. Using this new methodology, new metallopolymer systems were successfully synthesized, including PDMAEMA-g-[2Fe-2S], a water soluble HER catalyst that exhibits current densities comparable to a platinum electrode with an overpotential of only 0.23 V. This system has also demonstrated substantial aerobic stability. While the methodology has been demonstrated with vinylic monomers, the present invention is not limited to vinylic monomers alone. In other embodiments, this approach to active site polymer encapsulation may be utilized in a wide variety of catalytic systems to provide site isolation, solubility, improved stability, processability, and rate increases.

Alternative Catalyst Embodiments

According to another embodiment, the present invention features a metallopolymer comprising photoactive regioregular poly(3-hexylthiophene) (P3HT) and catalytically active diiron-disulfide complexes. These diiron-based complexes are biomimetic analogues of the active sites in Fe—Fe hydrogenase enzymes that are also active in the electrocatalytic generation of molecular hydrogen ($H_2$). As previously described, diiron-disulfide hexacarbonyl complexes ($Fe_2S_2CO_6$) can be selectively functionalized to afford a variety of bonding motifs that readily lend themselves to the formation of metallopolymeric materials.

Referring now to FIG. 21-31, the present invention features a photocatalytic metallopolymer composition for generating hydrogen ($H_2$). In one embodiment, the composition may comprise a metallopolymer complex according to the following:

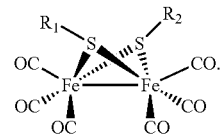

In some embodiments, $R_1$ can be a polymeric ligand selected from a group consisting of a photoactive regioregular poly(3-hexylthiophene)(P3HT) ligand, a water soluble ligand, polyethylene oxide, poly(acrylic acid), and a polymer derived from monomers selected from a group consisting of vinylic monomers, ethylenically unsaturated monomers, styrenic monomers, acrylate monomers, methacrylate monomers, acrylonitrile monomers, allylic monomers, vinylpyridine monomers, isobutylene monomers, maleimide monomers, norbornene monomers, monomers having at least one vinyl ether moiety, monomers having at least one isopropenyl moiety, and alkynylly unsaturated monomers, In other embodiments, $R_2$ may be selected from a group consisting of a phenyl, a

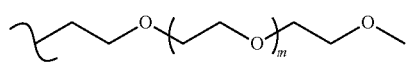

with m ranging from 1 to 20, a

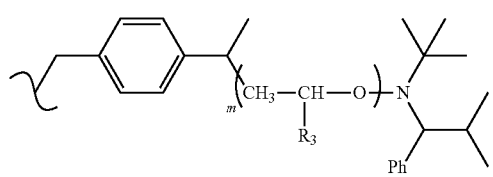

where $R_3$ is a phenyl or $COOR_4$ and $R_4$ is H or an alkyl group $C_2$-$C_{10}$, and a polymer derived from monomers selected from a group consisting of vinylic monomers, ethylenically unsaturated monomers, styrenic monomers, acrylate monomers, methacrylate monomers, acrylonitrile monomers, allylic monomers, vinylpyridine monomers, isobutylene monomers, maleimide monomers, norbornene monomers, monomers having at least one vinyl ether moiety, monomers having at least one isopropenyl moiety, and alkynylly unsaturated monomers. In a preferred embodiment, $R_2$ can impart water solubility to the metallopolymer complex.

Without wishing to limit the invention to a particular theory or mechanism, the polymeric ligand is capable of promoting photoinduced electron transfer to a diiron metal center of the metallopolymer complex. Further still, the metallopolymer complex generates Hz upon irradiation of the photocatalytic metallopolymer composition in the presence of a proton donor.

According to another embodiment, the photocatalytic metallopolymer composition for generating hydrogen (Hz) may comprise a metallopolymer complex according to the following:

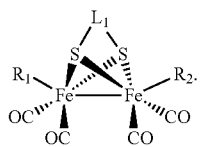

In one embodiment, $L_1$ may be an aryl. In another embodiment, $R_1$ and $R_2$ can each be, independently, a —CO or a polymeric ligand capable of promoting photoinduced electron transfer to a diiron metal center of the metallopolymer complex. Examples of the polymeric ligand include, but are not limited to, a photoactive regioregular poly(3-hexylthiophene)(P3HT) ligand, a water soluble ligand, polyethylene oxide, poly(acrylic acid), and a polymer derived from monomers such as, for example, vinylic monomers, ethylenically unsaturated monomers, styrenic monomers, acrylate monomers, methacrylate monomers, acrylonitrile monomers, allylic monomers, vinylpyridine monomers, isobutylene monomers, maleimide monomers, norbornene monomers, monomers having at least one vinyl ether moiety, monomers having at least one isopropenyl moiety, or alkynylly unsaturated monomers. Preferably, upon irradiation of the photocatalytic metallopolymer composition in the presence of a proton donor, the metallopolymer complex generates Hz.

In preferred embodiments, the polymeric ligand of any of the photocatalytic metallopolymer compositions described herein is a P3HT ligand. The P3HT ligand can act as a photosensitizer and intermolecular electron donor. In some embodiments, the P3HT ligand may be according to the following:

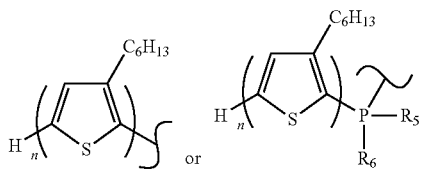

In some embodiments, n can range from 1 to 20. In other embodiments, $R_5$ and $R_6$ are each independently an H, an alkyl group $C_2$-$C_{10}$, or a phenyl.

For any of the photocatalytic metallopolymer compositions described herein, the metallopolymer complex can absorb light in the UV-Visible spectrum. The metallopolymer complex may also be a biomimetic analogue of hydrogenase.

According to one embodiment, the present invention features a method of generating molecular hydrogen ($H_2$). The method may comprise providing any of the photocatalytic metallopolymer compositions, adding the photocatalytic metallopolymer composition to a proton source, and irradiating the photocatalytic metallopolymer composition and proton source with UV or visible light. Without wishing to limit the invention to a particular theory or mechanism, the photocatalytic metallopolymer composition can act as an electron donor upon irradiation with light, thereby reducing a proton of the proton source to produce $H_2$. Examples of the proton source include, but are not limited to, water, a carboxylic acid, or a thiol.

According to another embodiment, the present invention features a method of producing a photocatalytic metallopolymer complex for generating molecular hydrogen ($H_2$). The method may comprise providing a diiron-disulfide complex according to the following structure:

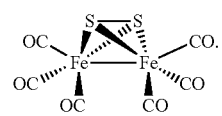

In one embodiment, the method may further comprise providing poly(3-hexylthiophene)(P3HT), reacting the P3HT with an organometallic halide to produce a halide-terminated P3HT ligand, reacting the halide-terminated P3HT ligand with the diiron-disulfide complex such that the P3HT ligand binds to one of the sulphides, providing an alkyl halide-terminated polymer ligand, and alkylating the diiron-disulfide complex with the alkyl halide-terminated polymer ligand at the second sulfide to produce the photocatalytic metallopolymer complex. In some embodiments, the organometallic halide is MgX. In other embodiments, the alkyl halide-terminated polymer is benzyl chloride (BzCl), polystyrene BzCl (PS-BzCl), or poly(t-butyl acrylate)-BzCl)(PtBA-BzCl). Without wishing to limit the invention to a particular theory or mechanism, the P3HT ligand is capable of promoting photoinduced electron transfer to a diiron metal center of the metallopolymer complex. Upon irradiation of the metallopolymer complex in the presence of a proton donor, the metallopolymer complex generates $H_2$.

In yet another embodiment, the method of producing a photocatalytic metallopolymer complex for generating molecular hydrogen ($H_2$) may comprise providing a diiron-disulfide complex according to the following structure:

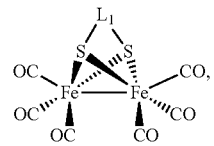

where $L_1$ can be an aryl.

In one embodiment, the method may further comprise providing poly(3-hexylthiophene)(P3HT), reacting P3HT with a phosphine to produce a phosphine-terminated P3HT ligand, and substituting at least one carbonyl moiety of the diiron-disulfide complex with the phosphine-terminated P3HT ligand to produce the photocatalytic metallopolymer complex. Without wishing to limit the invention to a particular theory or mechanism, the P3HT ligand is capable of promoting photoinduced electron transfer to a diiron metal center of the metallopolymer complex. The metallopolymer complex generates $H_2$ upon irradiation of the metallopolymer complex in the presence of a proton donor.

In some embodiments, a phosphine moiety of the phosphine-terminated P3HT ligand may comprise —$PPh_2$. In other embodiments, one carbonyl moiety of the diiron-disulfide complex is substituted with the phosphine-terminated P3HT such that metallopolymer complex is unsymmetric. In yet other embodiments, two carbonyl moieties of the diiron-disulfide complex are each substituted with the phosphine-terminated P3HT such that metallopolymer complex is symmetric.

Photocatalyst Examples

The following are non-limiting examples of the present invention. It is to be understood that said examples are provided for the purpose of demonstrating the present invention in practice, and is in no way intended to limit the invention. Equivalents or substitutes are within the scope of the invention.

Synthesis of P3HT Metallopolymers

Figure 23:
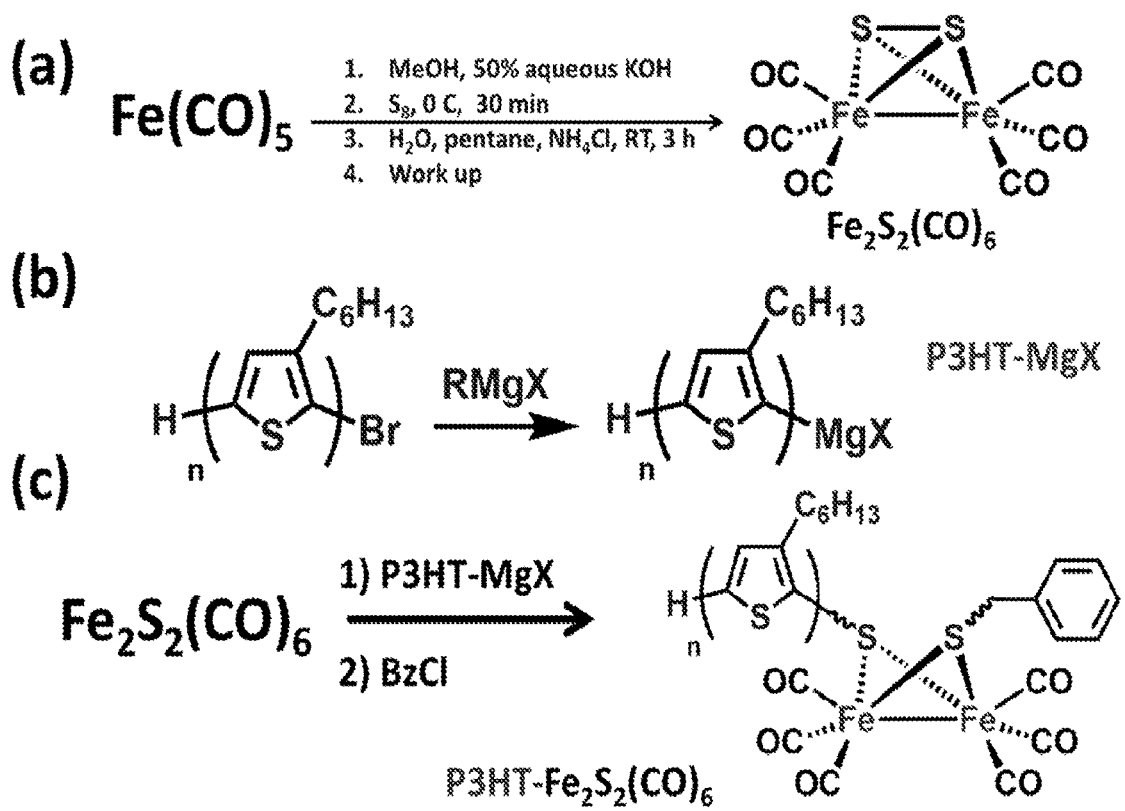
FIG. 23 shows an exemplary reaction scheme for (a) synthesis of $Fe_2S_2(CO)_6$ disulfide complex; (b) Grignard terminated regioregular P3HT; and (c) unsymmetric diiron complex via reaction of P3HT-MgX and alkylation with benzyl halides.

The synthesis of metallopolymers bearing a single P3HT ligand and a small molecule benzyl, or methyl group is shown in FIG. 23. A P3HT with a single terminal —MgX group is prepared via magnesium halogen exchange of a P3HT prepared by the GRIM method (which are capped with —H and —Br groups) followed by treatment with i-PrMgCl. Alkylation of the reactive thiolate form of the complex is conducted with benzyl halides, or methyl iodide. Structural characterization of the target metallopolymer may be determined using 1H NMR and IR spectroscopies in conjunction with SEC.

Figure 24:
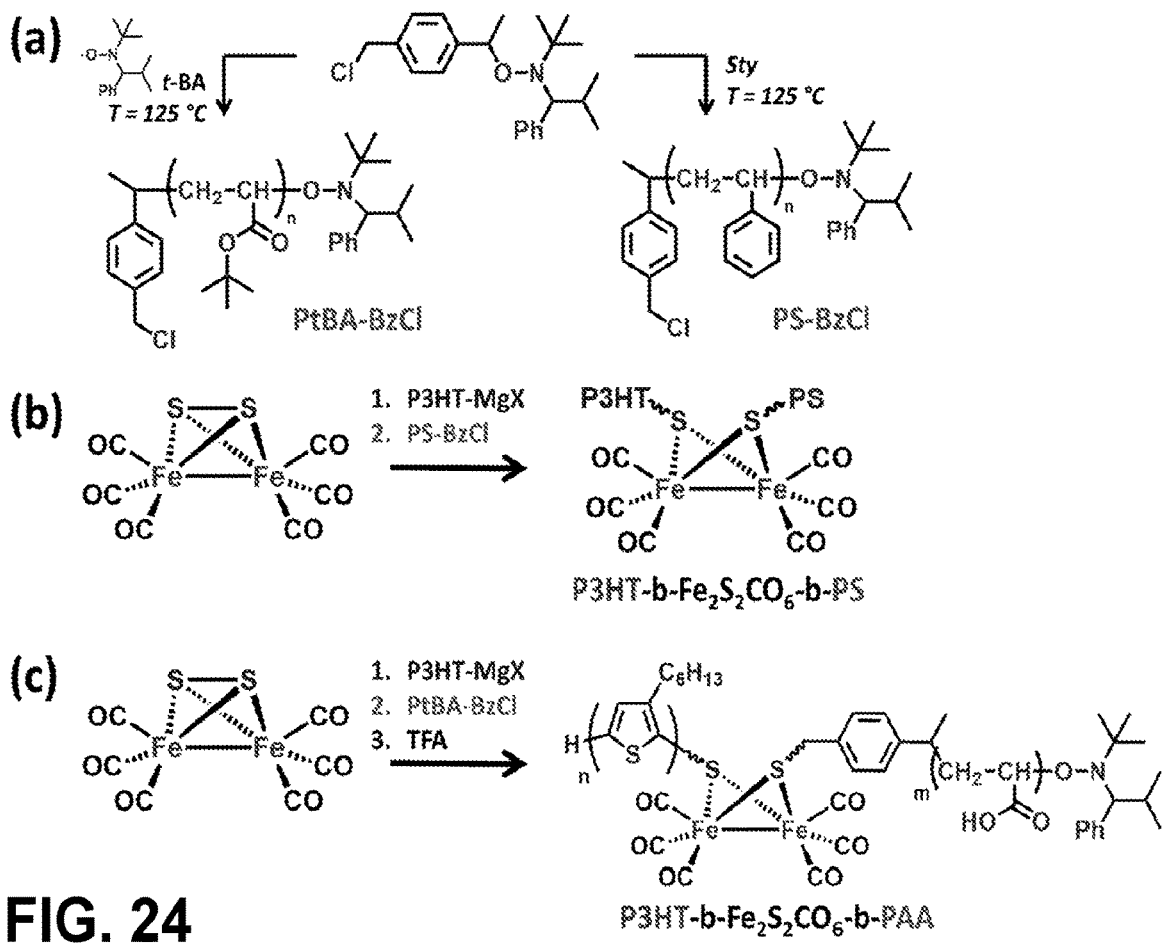
FIG. 24 shows an exemplary reaction scheme for (a) synthesis of benzyl halide terminated polystyrene and poly (t-butyl acrylate) followed by (b) alkylation of reactive P3HT thiolates with these polymeric benzyl halides (BnBr) to form A-B diblock metallopolymers (c) synthesis of water dispersable A-B diblocks via alkylation of poly-(t-BA) and deprotection with TFA.

Referring to FIG. 24, A-B diblock metallopolymers are prepared by alkylation of reactive P3HT thiolate intermediates with alkyl halide terminated polymers. The use of the benzyl chloride functional alkoxyamine initiators can afford well-defined homopolymers of polystyrene and polyacrylates bearing a primary benzyl chloride end group without the need for protecting group chemistry. Polystyrenes and poly(t-butyl acrylates) in the range of $M_n$~2000-5000 g/mol are prepared and used to form A-B diblock metallopolymer complexes, using the methods previously discussed. The efficiency of the alkylation reaction can be quantified using SEC. Purification of the metallopolymer can be conducted using silica gel column chromatography, which is effective to remove more polar polyacrylates.

Furthermore, water soluble A-B diblock metallopolymers can be prepared via alkylation of alkyl halide terminated methyl monoether polyethylene glycol ($M_n$~2000-10000 g/mol) with P3HT thiolate intermediates. Water soluble complexes can also be prepared by acidic deprotection of P3HT-block-$Fe_2S_2(CO)_6$-block-poly(acrylic acid) (P3HT-b-$Fe_2S_2CO_6$-b-PAA) with TFA, since the diiron complex was found to be stable to TFA. Without wishing to limit the invention to a particular theory or mechanism, the amphiphilic A-B diblock metallopolymers can form block copolymer micelles when dispersed in water.

Phosphine Terminated P3HT Ligands.

Figure 25:
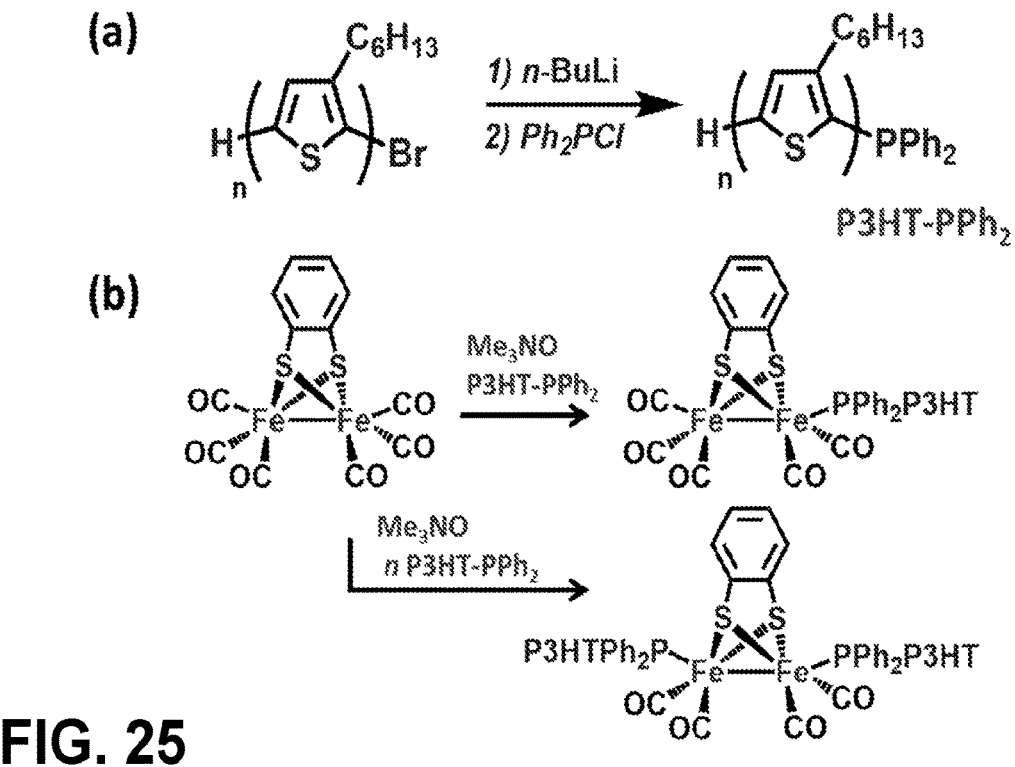
FIG. 25 shows an exemplary reaction scheme for (a) proposed synthesis of phosphine terminated P3HT ligands and (b) preparation of metallopolymer complexes with mono, or bis-P3HT ligands.

Referring to FIG. 25, an additional strategy for preparing P3HT covalently attached to a [FeFe]-hydrogenase active site mimic is to append P3HT with a phosphine moiety which can then be used as a ligand for iron in place of a CO ligand. The simplest strategy for accomplishing this is to prepare P3HT with a terminal phosphine ligand. In a few cases, the metal complexes can be electropolymerized to give conducting films but the preparation of polythiophenes appended with phosphines and their metal complexes have not been reported. Consequently, the first task is to prepare P3HT with a terminal phosphine. The standard method for preparing thiophene phosphines is to react a lithiothiophene with a phosphorus electrophile: $Ar_2PX$, $ArPX_2$ or $PX_3$, X=Cl or Br. The lithiothiophene is obtained by deprotonation of the thiophene with t-BuLi or halogen metal exchange of the α-halo (Br or I) thiophene with n-BuLi. Once the phosphine terminated P3HT is in hand the reactions with Benzcat is carried analogously to the ligand substitution reactions. The ability of phosphine terminated P3HT ligated to Benzcat to generate $H_2$ on irradiation can be evaluated using the methodology outlined above for the other P3HT-[2Fe2S] polymers. Without wishing to limit the invention to a particular theory or mechanism, the [FeFe]-hydrogenase active site mimics with phosphines instead of CO ligands are reduced at potentials 0.2 to 0.3 V more negative. This means that the LUMO energy level of these complexes is raised and the viability of electron-transfer from the excited state HOMO of the P3HT moiety to the [2Fe2S] moiety may be at issue. However, the electron donating ability of the phosphine may be ameliorated by electron-withdrawing substituents; thus, metallopolymers can also be prepared from the commercially available bis(p-trifluoromethylphenyl)phosphorus chloride and bis(p-pentafluoro-phenyl) phosphorus chloride. In addition, pyrrolidino groups on phosphorus increase their n-acceptor properties and it has been reported that the mono- and bis-tripyrrolidinophosphine complexes undergo only small cathodic shifts of 30 and 60 mV, respectively, as compared to their all-CO ligated [2Fe2S] complexes.

Characterization of Metallopolymers

Various spectroscopic methods such as $^1H$ and $^{13}C$ NMR and IR are useful in characterizing 2Fe2S active site mimics as well as X-ray crystallography. X-ray crystal structure analysis is not feasible for the metallopolymers but NMR and IR spectroscopic analysis are essential. In addition, to $^1H$ and $^{13}C$ NMR spectroscopic analysis $^{31}P$ NMR spectroscopy are useful in characterizing the phosphino polymeric ligands and their 2Fe2S complexes. It should be noted that IR spectroscopic analysis is especially useful because the metal carbonyl stretching bands are especially strong and occur in a characteristic region of the IR that is devoid of most other absorptions. In addition, the position of these bands depends on the electron richness of the metal center, for example, the metal carbonyl IR stretching frequencies of 1PTA occur at 2052 (s), 1993 (s), 1978 (s), 1939 (w) whereas those of the more electron-rich center in the bis-phosphine complex 1PTA2 occur at 2002 (s), 1959 (s), 1936 (s), 1926 (w) $cm^{-1}$. In the case of P3HT, the hexyl groups and thiophene hydrogens occur in characteristic regions and it is known that in thiol terminated P3HT the chemical shift of the adjacent $CH_2$ moiety of the hexyl group undergoes a shift.

Intermolecular Electron Transfer

In one embodiment, poly(3-hexylthiophene) (P3HT) and fullerene derivatives are used in bulk heterojunction solar cells because upon irradiation, P3HT forms excitons which migrate to the interface with the fullerene derivative wherein ionization occurs with an electron migrating through the fullerene and the hole migrating through the P3HT. To effect exciton dissociation, a key advance was the finding that photoinduced electron-transfer from π-conjugated polymers such as polythiophene to $C_{60}$ was ultrafast. Consequently, bulk heterojunction cells, epitomized by regioregular poly (3-hexylthiophene) P3HT and a fullerene derivative: [6,6]-phenyl-$C_{61}$ butyric acid methyl ester $C_{61}$PCBM, in which the two materials form a interpenetrating bi-continuous material proved especially advantageous. Here, on photo-excitation, the exciton formed in the P3HT material diffuses to the interface with $C_{61}$PCBM and an electron is transferred. In this process, the photoexcited P3HT acts as an electron donor and the $C_{61}$PCBM acts as an electron acceptor. Although this electron transfer separates the electron and hole, they are still coulombically bound. This coulombically bound interfacial electron-hole pair must then dissociate into free charge carriers.

The fullerene derivative can be replaced by a bioinspired hydrogenase active site 2Fe-2S model and covalently linked. Furthermore, the experiments can be done in solution in the presence of weak acid that is stronger than acetic acid, and a sacrificial electron donor. It is expected that the polythiophene preferentially absorbs the light. Without wishing to limit the invention to a particular theory or mechanism, the exciton formed by absorption of a photon by P3HT would ionize and transfer an electron to Benzcat forming the corresponding radical anion and concomitantly forming a hole in the polymer. For this to be energetically favorable, the LUMO energy level of the P3HT must be higher in energy than the LUMO level of Benzcat. Furthermore, the reduction of potential of Benzcat and its LUMO energy can be tuned by substituents on the benzene ring. In order to generate $H_2$ from protons, $2e^-$ are required as follows: $2H^+ + 2e^- = H_2$.

Figure 26:
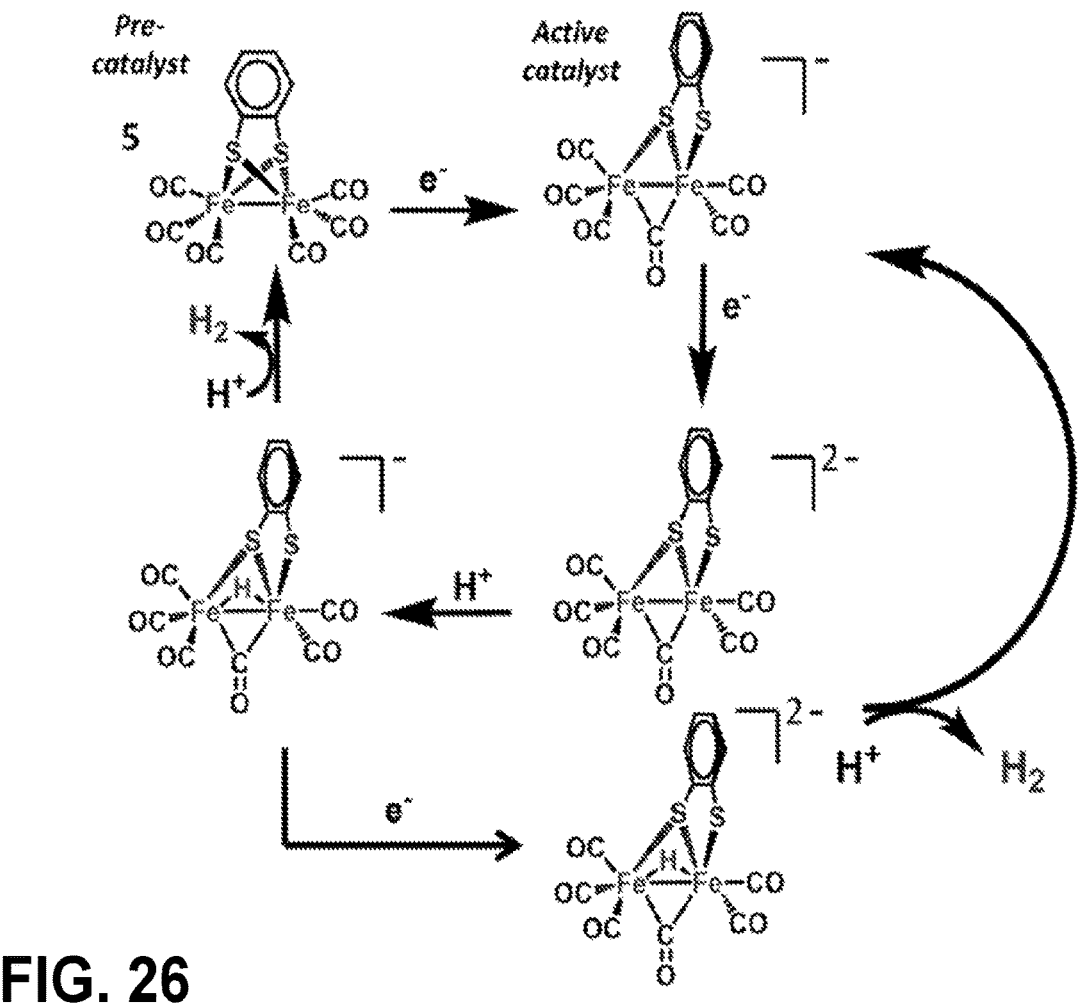
FIG. 26 is a non-limiting example catalytic generation of $H_2$ with benzo$Fe_2S_2(CO)_6$ (Benzcat).
Figure 27:
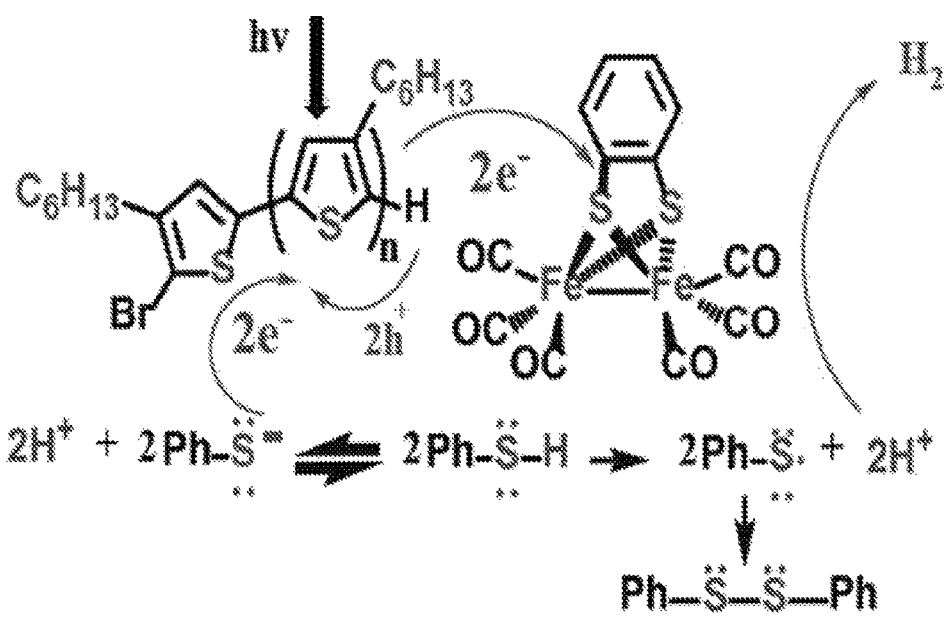
FIG. 27 shows a non-limiting example of a photocatalytic HER scheme.
Figure 28:
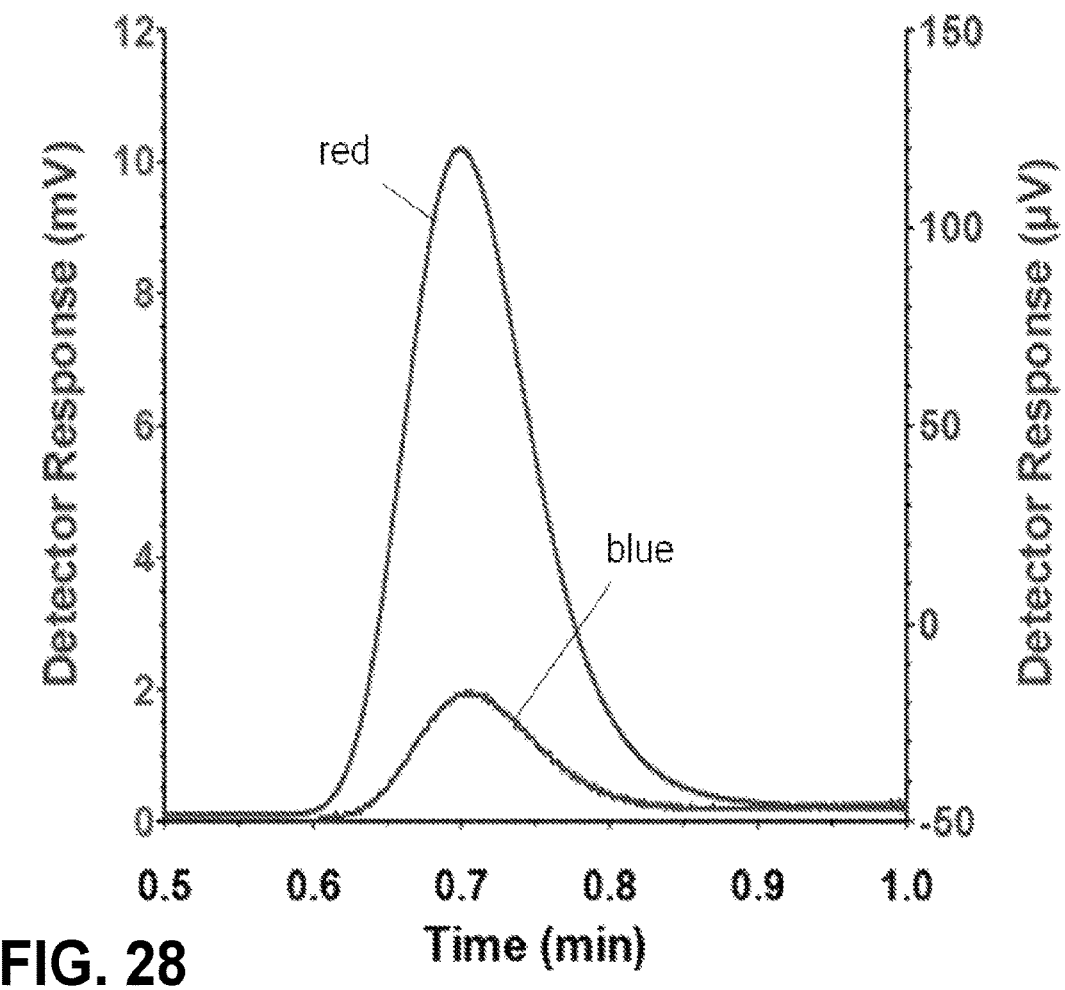
FIG. 28 shows a Gas Chromatogram (GC) of $H_2$ peak in overhead gasses upon irradiation of Benzcat, P3HT, and PhSH in toluene (red trace, left y-axis) and the control experiment without P3HT (blue trace, right y-axis). A third control without Benzcat did not produce detectable amounts of $H_2$ under the same conditions (data not shown).
Figure 29:
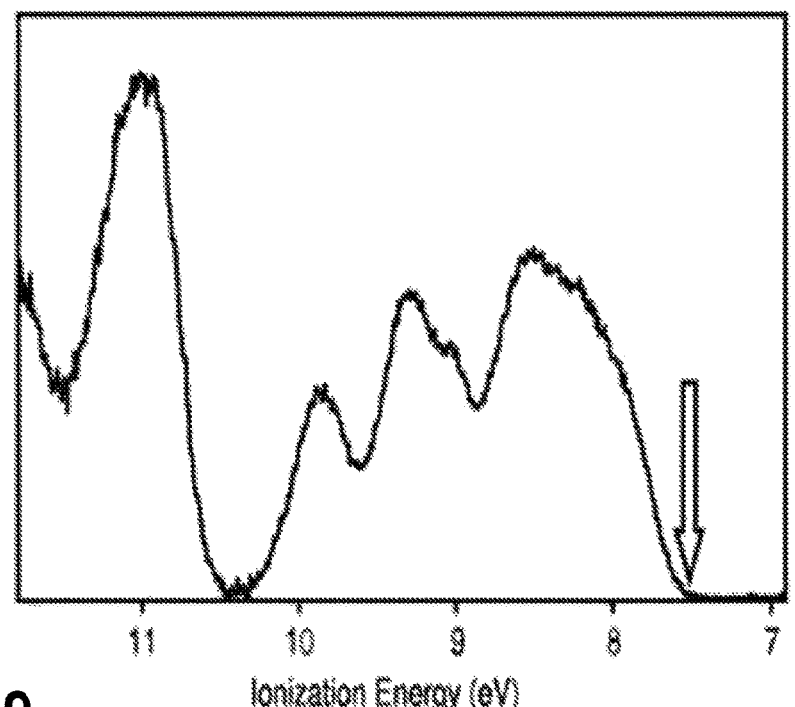
FIG. 29 shows Ultraviolet Photoelectron Spectroscopy (UPS) data for Benzcat showing an ionization onset (HOMO energy) at 7.50 eV.
Figure 30:
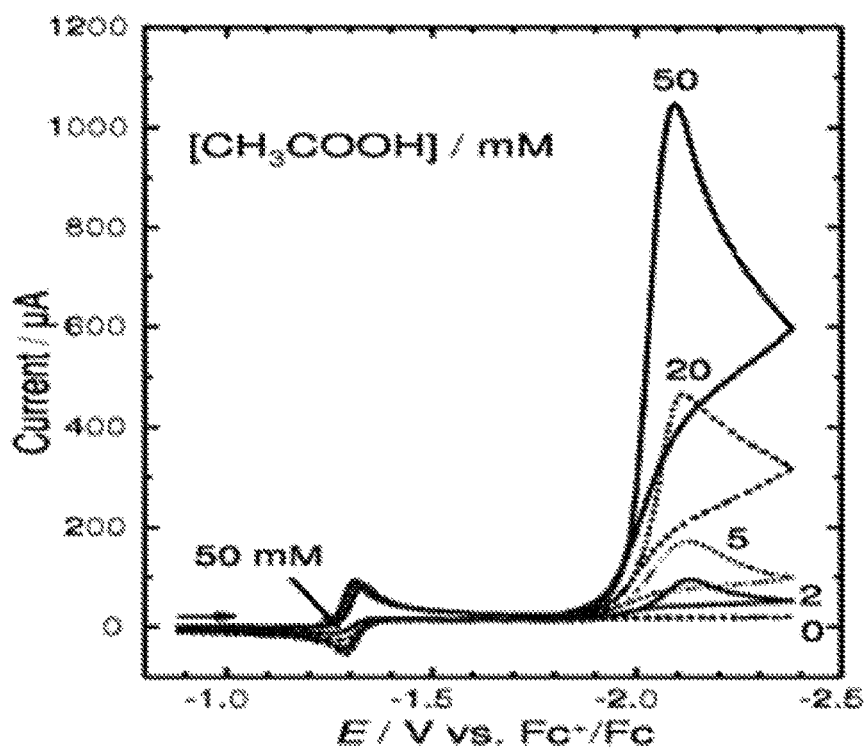
FIG. 30 shows CV of Benzcat (1 mM) in $CH_3CN$ with increasing catalytic current and increasing amounts of acetic acid.

Addition of a second electron to Benzcat is more favorable energetically than addition of the first electron, that is, there is potential inversion, rendering addition of a second electron to the stable Benzcat anion radical more favorable than the first after reorganization as outlined in FIG. 26. Note that the reorganization obtained after one-electron reduction requires rotation around one of the Fe atoms, formation of a bridging CO and Fe—S bond weakening. Protonation followed by $H_2$ loss regenerates Benzcat. The hole in P3HT is filled by the sacrificial electron donor regenerating P3HT.

An experiment was done in which a solution of P3HT and Benzcat in toluene was irradiated with light of greater than 450 nm with thiophenol as the proton and electron source and the formation of $H_2$ was detected by gas chromatographic analysis on a molecular sieves column using a thermal conductivity detector. Efficient photocatalytic generation of $H_2$ was shown by GC analysis (see FIG. 28). It is theorized that the mechanism occurs in which 2e are added to Benzcat and thiophenol protonates the dianion. The hole in the P3HT is filled by electron transfer from thiophenol and this generates strong acid to react with the μ-bridged hydride producing $H_2$ and regenerating Benzcat. It should be noted that spectroscopic studies with P3HT and Benzcat did not show any evidence for association in the ground state, that is, the UV-Vis absorption spectrum of a mixture of P3HT and Benzcat was the same as the sum of the individual spectra. In this experiment, the photoexcited P3HT and Benzcat must near each other for electron transfer to occur. In other embodiments, it may be possible to improve this electron transfer by covalently attaching the two moieties by side-chain or end functionalization of P3HT.

Intramolecular Electron Transfer

The efficiency of electron transfer between P3HT and Fe2S2 catalytic moieties on irradiation can increase in the metallopolymers outlined above. Consequently, irradiation of these metallopolymers in organic solvents in the presence of thiophenol can more efficiently produce $H_2$. In addition, irradiation of the A-B diblock metallopolymers can be done in water or aqueous THF. Without wishing to limit the invention to a particular theory or mechanism, it is theorized that this reaction is a surface reaction in which the thiolate anion binds to the surface of the quantum dot and transfers an electron to the photoexcited quantum dot. The thiolate radical, which is observed by EPR spectroscopy, then couples and concomitantly forms $H_2$. However, no $H_2$ is produced upon irradiation of P3HT and thiophenol. The presence of Benzcat is required for rapid production of $H_2$. It is important to note that the present experiments were done in toluene. Under aqueous conditions, thiolate is present, but in toluene, its concentration is very low because the pKa of thiophenol in toluene is much greater than in water. It should be emphasized that under the present conditions, it is assumed that the reaction forming $H_2$ is ionic, not free radical. That is, a proton reacts with the iron hydride forming $H_2$. The consequences of performing the photoreaction with 2Fe2S metallopolymers in water are of value. It should be noted that irradiation of Benzcat in the presence of eosin as photosensitizer and $Et_3N$ as sacrificial electron donor at pH<6 in SDS micelles affords $H_2$. For example, the aqueous system allows for control of the pH of the solution using buffers. Irradiation of P3HT-2Fe2S in the presence of thiophenol at neutral pH may result in evolution of $H_2$ due to the free radical process outlined above owing to the presence of phenylthiolate. However, at low pH where there is little thiolate, the ionic mechanism outlined above may dominate. This is important because in water, splitting cell protons generated by oxidation of water can catalytically reduce on irradiation of the present catalysts. In the system in which hydrogenase is replaced by P3HT-2Fe2S photocatalysts, both the oxidation of water and the reduction of protons would be photocatalyzed. Ideally, in such a system no sacrificial reagent would be required.

Figure 31:
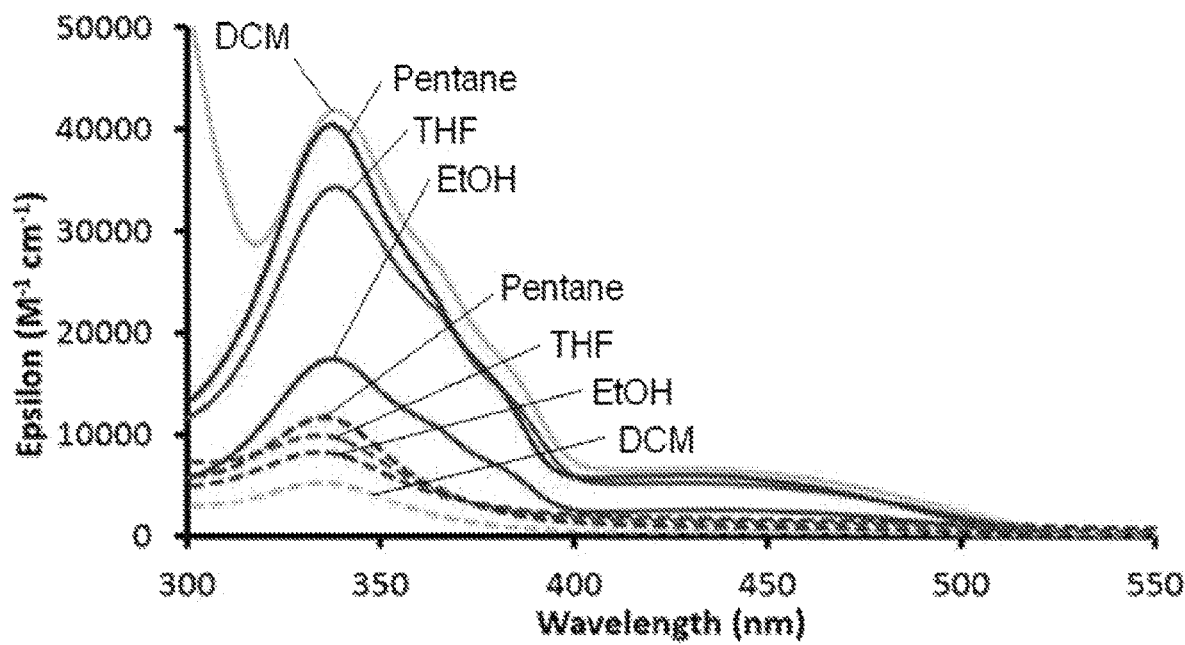
FIG. 31 shows absorption spectra for monothiophene complex (dotted lines) and terthiophene complex (solid lines) in various solvents at equal concentrations.

[FeFe]-Hydrogenase mimics absorb in the visible in the same region as polythiophenes. Consequently, it is relevant to consider which moiety preferentially absorbs light. Oligothiophenes may be able to selectively absorb light and there may even be charge transfer bands in these complexes. Of particular note is the visible absorption spectrum of terthiophene catalyst as compared with monothiophene catalyst, as shown in FIG. 31. The extinction coefficient for the absorption at ca. 350 nm increases dramatically as the number of thiophene rings increases. Furthermore, there appears to be long wavelength bands in the oligothiophene complexes that are not in the monothiophene complex. In the visible absorption spectrum of the terthiophene catalyst, there is a new peak with a maximum 90 nm to the pentane line of the monothiophene complex and the extinction coefficient is increased dramatically (ca. 25x). This long wavelength band suggests the possibility of a charge transfer band with the oligothiophene acting as the donor and the Fe2S2 moiety acting as the acceptor. Although the new long wavelength bands do not shift in absorption maxima as a function of solvent polarity, they still may be charge transfer bands.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. An electrocatalytic metallopolymer for generating hydrogen ($H_2$), said metallopolymer comprising an electrocatalytically active complex bonded to a polymer, wherein the metallopolymer accepts electrons and generates $H_2$; wherein the metallopolymer is according to the following:

Complex-$L_1$-(Polymer)$_i$, wherein i is 1 or 2;

wherein the electrocatalytically active complex is the following:

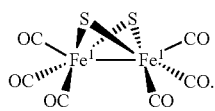

2. The metallopolymer of claim 1, wherein $L_1$ is the following:

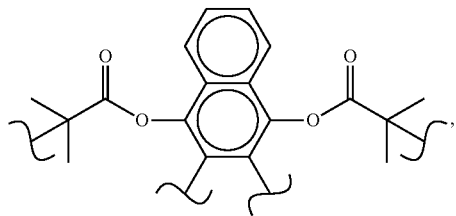

wherein a phenyl group of $L_1$ is bonded to the complex.

3. The metallopolymer of claim 1, wherein the polymer is according to the following:

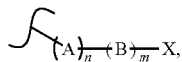

wherein X is I, Br or Cl, wherein m ranges from about 1-1,000, wherein n ranges from about 1-1,000, wherein A and B are each derived from an unsaturated monomer, and wherein A is identical to B or A is different from B.

4. The metallopolymer of claim 3, wherein the polymer imparts water solubility to the metallopolymer.

5. The metallopolymer of claim 1, wherein the metallopolymer complex is according to any one of the following:

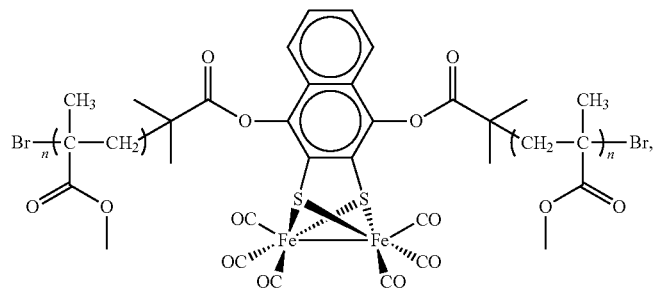

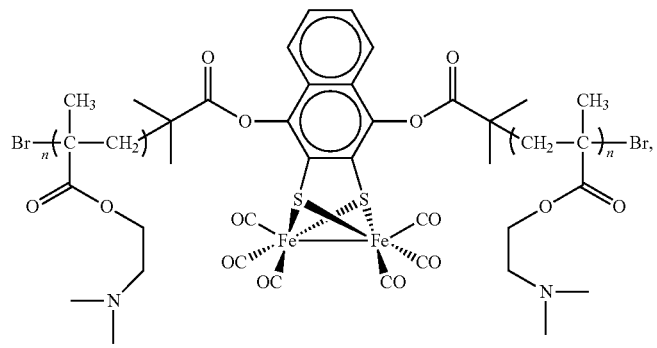

-continued

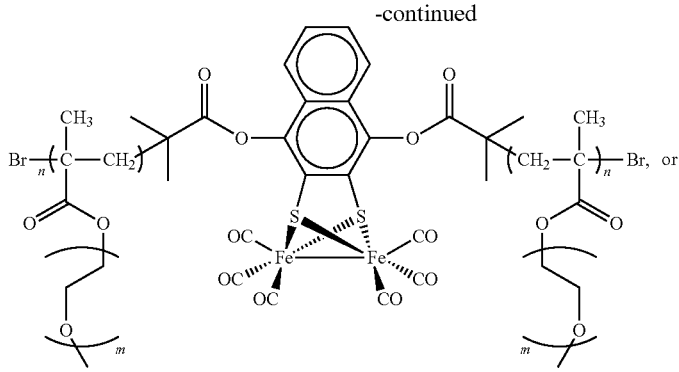

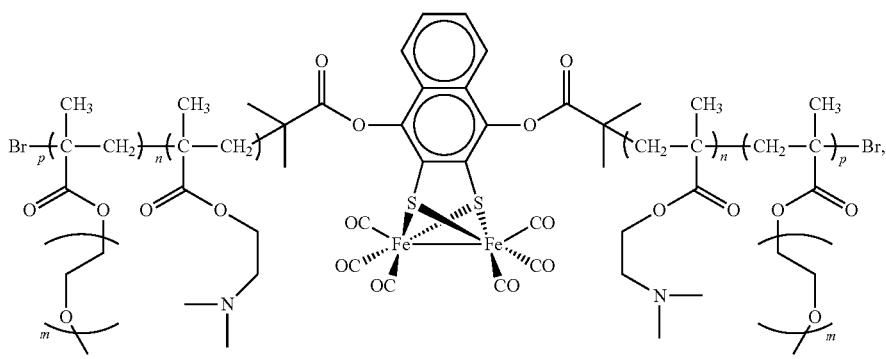

wherein m ranges from about 1-100, wherein n ranges from about 1-1,000, and wherein p ranges from about 1-1,000.

6. The metallopolymer of claim 1, wherein the metallopolymer complex is soluble in organic or aqueous solutions.

7. The metallopolymer of claim 1, wherein the metallopolymer complex has an $M_w:M_n$ ratio that is less than about 1.3.

8. The metallopolymer of claim 1, wherein the metallopolymer complex is capable of generating $H_2$ from aqueous solutions.

9. The metallopolymer of claim 1, wherein the metallopolymer complex is stable when exposed to an aerobic environment.

10. The metallopolymer of claim 9, wherein the metallopolymer complex maintains stability when exposed to the aerobic environment during $H_2$ generation.

11. The metallopolymer of claim 1, wherein the metallopolymer complex has a turn over frequency of at least about $10^3$ k(s$^{-1}$) in water.

12. The metallopolymer of claim 1, wherein the metallopolymer complex has an overpotential of at most about 700 mV in water.

13. A method of generating molecular hydrogen ($H_2$), said method comprising:
   a) providing the electrocatalytic metallopolymer according to claim 1;
   b) adding the electrocatalytic metallopolymer to an organic or aqueous electrolyte solution to form an electrocatalytic mixture; and
   c) performing electrolysis using the electrocatalytic mixture, wherein the electrocatalytic metallopolymer accepts electrons from a cathode, generating a reduced form of the electrocatalytic metallopolymer which is protonated by some protic species in solution, thereby reducing protons in the electrolyte solution to produce $H_2$.

14. The method of claim 13, wherein the electrolyte solution comprises water, tetrahydrofuran, acetonitrile, alcohol, ammonium, alkyl ammoniums, sulfonic acids, carboxylic acids, or a combination thereof.

15. A method of producing the electrocatalytic metallopolymer according to claim 1, said method comprising:
   a) providing a metalloinitiator according to the following structure:

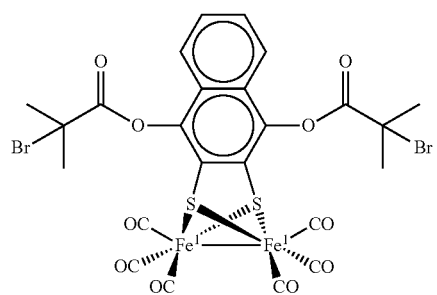

b) providing an unsaturated monomer;
   c) providing a transition metal catalyst;
   d) providing a ligand;
   e) mixing the transition metal catalyst and ligand to form a metal-ligand catalyst; and f) mixing and heating the metalloinitiator, unsaturated monomer, and metal-ligand catalyst to activate an atom-transfer radical-polymerization (ATRP) reaction, thereby forming the electrocatalytic metallopolymer.

16. The method of claim 15, wherein providing the metalloinitiator comprises:

a. providing a hydroquinone complex according to the following structure:

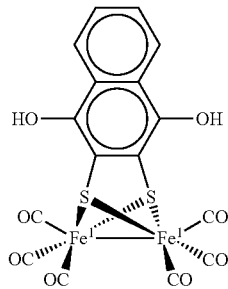

b. providing α-bromoisobutyryl bromide (BIBB); and c. mixing the hydroquinone complex and BIBB, wherein the BIBB esterifies the hydroquinone complex to produce the metalloinitiator.

17. An electrocatalytic metallopolymer for generating hydrogen ($H_2$), said metallopolymer comprising a metallopolymer complex according to Formula 1:

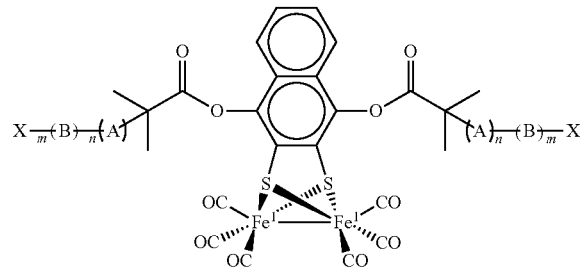

(Formula 1)

wherein X is I, Br or Cl, wherein m ranges from about 1-1,000, wherein n ranges from about 1-1,000, wherein A and B are each derived from an unsaturated monomer, and wherein A is identical to B or A is different from B.

18. An electrocatalytic metallopolymer for generating hydrogen ($H_2$), said metallopolymer comprising an electrocatalytically active complex bonded to a polymer, wherein the metallopolymer accepts electrons and generates $H_2$, wherein the metallopolymer is according to the following:

Complex-$L_1$-(Polymer)$_i$, wherein i is 1 or 2;

wherein the polymer is according to the following:

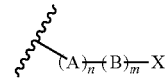

wherein X is I, Br or Cl, wherein m ranges from about 1-1,000, wherein n ranges from about 1-1,000, wherein A and B are each derived from an unsaturated monomer, and wherein A is identical to B or A is different from B.

* * * * *